(12) United States Patent
Peczalski et al.

(10) Patent No.: US 10,900,680 B2
(45) Date of Patent: Jan. 26, 2021

(54) HUMIDIFIER SYSTEM

(71) Applicant: Ademco Inc., Golden Valley, MN (US)

(72) Inventors: Andrzej Peczalski, Edina, MN (US);
Grant Wood, St. Paul, MN (US);
Jason L. Ableitner, Edina, MN (US);
Lauren Seymour, Minnetonka, MN (US); Brad A. Terlson, Maple Grove, MN (US); Thomas M. Rezachek, Cottage Grove, MN (US); Alex Gu, Plymouth, MN (US); Charles N. Hoff, Excelsior, MN (US); Andrew Smith, Morris Plains, NJ (US); Chris Ohlsen, Shorewood, MN (US); Adam D. McBrady, Minneapolis, MN (US)

(73) Assignee: Ademco Inc., Golden Valley, MN (US)

( * ) Notice: Subject to any disclaimer, the term of this patent is extended or adjusted under 35 U.S.C. 154(b) by 363 days.

(21) Appl. No.: 15/782,894

(22) Filed: Oct. 13, 2017

(65) Prior Publication Data
US 2018/0094825 A1 Apr. 5, 2018

Related U.S. Application Data

(63) Continuation-in-part of application No. 14/334,865, filed on Jul. 18, 2014, now Pat. No. 9,822,990.
(Continued)

(51) Int. Cl.
*F24F 6/00* (2006.01)
*F24F 6/04* (2006.01)
(Continued)

(52) U.S. Cl.
CPC ............... *F24F 6/043* (2013.01); *F24F 6/00* (2013.01); *F24F 6/14* (2013.01); *F24F 11/0008* (2013.01);
(Continued)

(58) Field of Classification Search
CPC ...... F24F 6/00; F24F 6/043; F24F 6/14; F24F 11/0008; F24F 11/30; F24F 13/22;
(Continued)

(56) References Cited

U.S. PATENT DOCUMENTS 1,994,331 A 3/1935 Ziskin et al.
2,101,603 A 12/1937 Stimson
(Continued)

FOREIGN PATENT DOCUMENTS

CN 203852774 U 10/2014
JP 54023240 A 2/1979
(Continued)

OTHER PUBLICATIONS

"Installation Instructions for the Programmable Humidifier Automatic Flushing Timer," 2 pages, prior to Jan. 15, 2010.
(Continued)

*Primary Examiner* — Charles S Bushey
(74) *Attorney, Agent, or Firm* — Shumaker & Sieffert, P.A.

(57) ABSTRACT

A system that provides effective and efficient introduction of water droplets into an air flow. The water droplets are sufficiently small so as to evaporate primarily before leaving the mixing enclosure where the droplets are injected by spray nozzles. Large droplets are kept to a minimum, thus reducing condensation and water accumulation to a very small amount. An amount of water usage is significantly less than that of a conventional evaporative humidifier of the same capacity. The present system may be placed in an enclosure that can readily replace other conventional evaporative humidifiers in enclosures. The present enclosure and system may be installed in lieu of a conventional enclosure and evaporative humidifier with minimal effort. The present enclosure has features that facilitate droplet to air mixing, (Continued)

Figure 1:
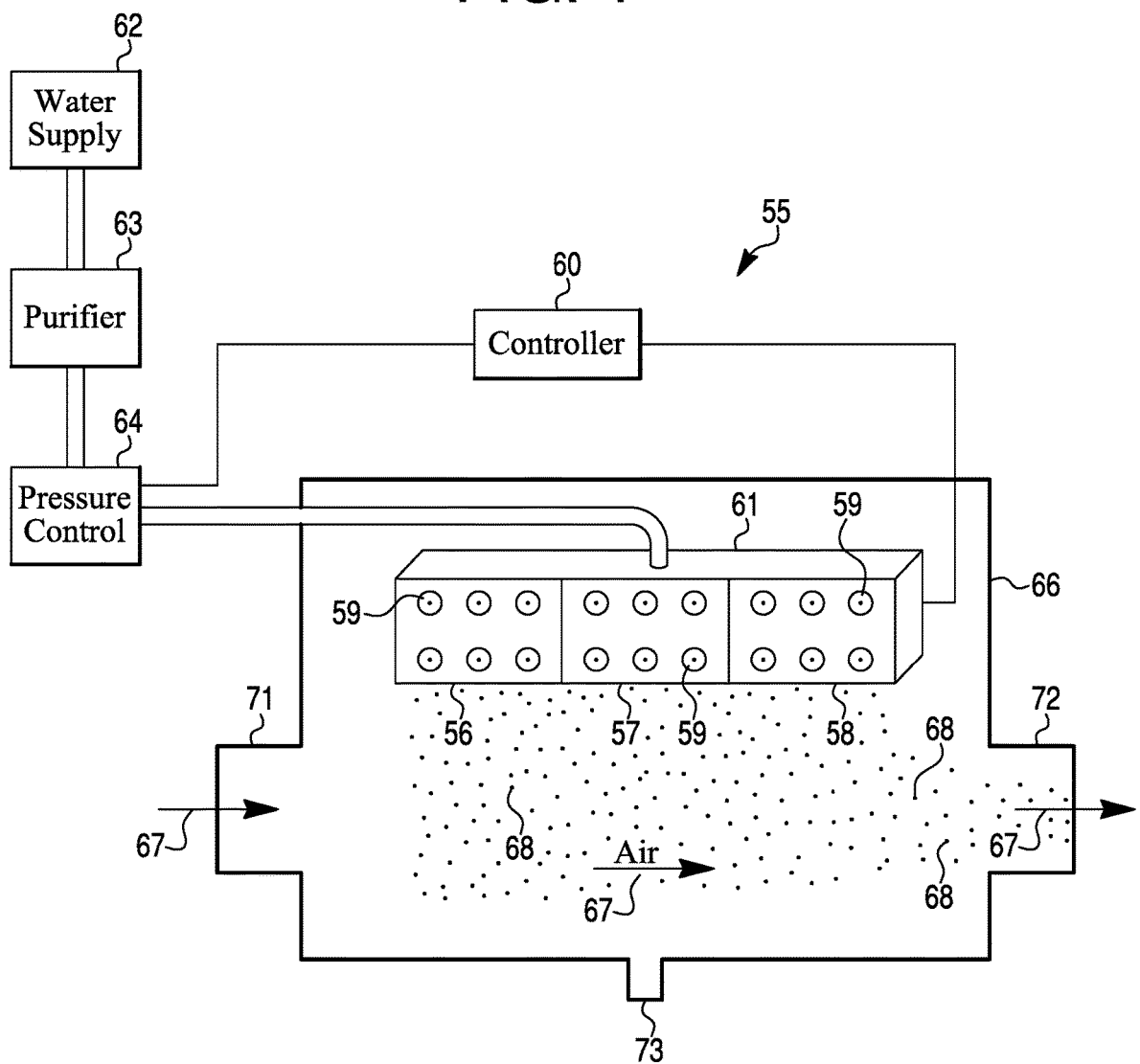
Figure 2A:
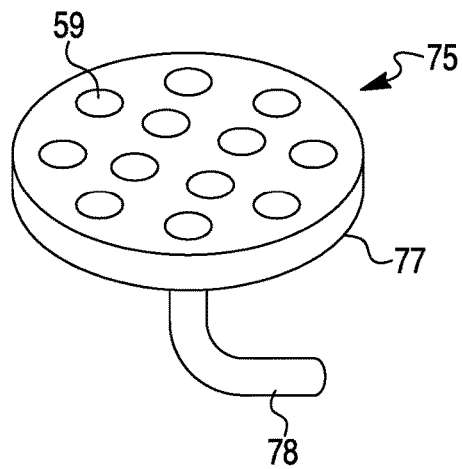
Figure 2C:
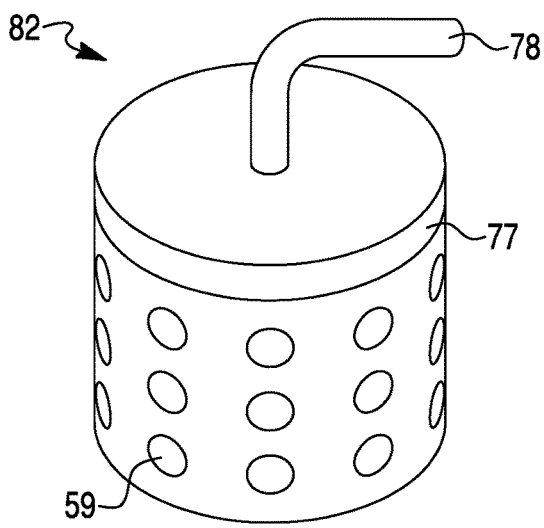
Figure 2B:
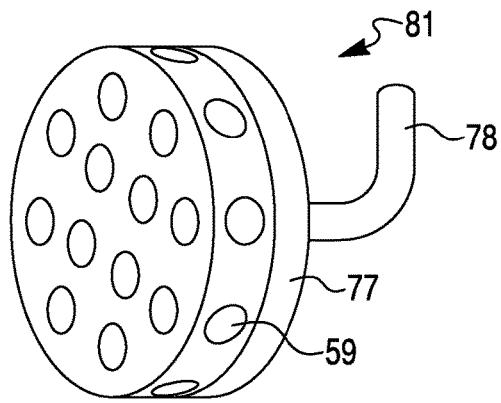
Figure 2D:
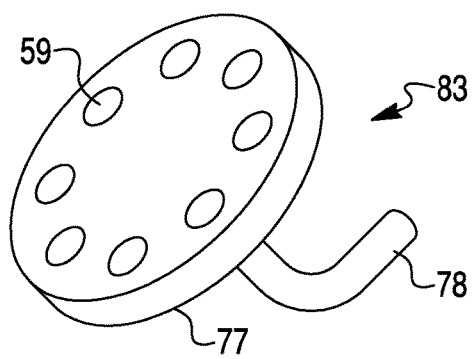

viewing, humidification, and testing. In permissible situations, the present system may replace a conventional system but retain the conventional enclosure.

22 Claims, 20 Drawing Sheets

Related U.S. Application Data

(60) Provisional application No. 62/408,668, filed on Oct. 14, 2016, provisional application No. 61/856,484, filed on Jul. 19, 2013.

(51) Int. Cl.
*F24F 6/14* (2006.01)
*F24F 11/00* (2018.01)
*F24F 13/22* (2006.01)
*F24F 11/30* (2018.01)
*F24F 110/20* (2018.01)
*F24F 110/10* (2018.01)
*F24F 110/30* (2018.01)

(52) U.S. Cl.
CPC .............. *F24F 11/30* (2018.01); *F24F 13/22* (2013.01); *F24F 13/222* (2013.01); *F24F 2013/221* (2013.01); *F24F 2013/225* (2013.01); *F24F 2110/10* (2018.01); *F24F 2110/20* (2018.01); *F24F 2110/30* (2018.01); *Y02B 30/54* (2013.01)

(58) Field of Classification Search
CPC .. F24F 13/222; F24F 2110/10; F24F 2110/20; F24F 2110/30; F24F 2013/221; F24F 2013/225; Y02B 30/545; Y02B 30/54
USPC ...... 261/128, 129, 130, 131, 137, 78.2, 115, 261/DIG. 15, 81
See application file for complete search history.

(56) References Cited

U.S. PATENT DOCUMENTS

| | | |
|---|---|---|
| 2,140,516 A | 12/1938 | Cowan |
| 2,519,515 A | 8/1950 | Turner |
| 2,533,794 A | 12/1950 | Hanks et al. |
| 2,587,834 A | 3/1952 | Goode |
| 2,777,935 A | 1/1957 | Schmitt et al. |
| 3,289,936 A | 12/1966 | Coburn |
| 3,319,046 A | 5/1967 | Katzman et al. |
| 3,365,181 A | 1/1968 | Schwaneke |
| 3,491,746 A | 1/1970 | Swimmer et al. |
| 3,523,175 A | 8/1970 | Gygax |
| 3,570,822 A | 3/1971 | Peterson et al. |
| 3,610,879 A | 10/1971 | Katzman et al. |
| 3,630,378 A | 12/1971 | Bauman |
| 3,659,078 A | 4/1972 | Rudstrom |
| 3,660,635 A | 5/1972 | Liebert |
| 3,672,706 A | 6/1972 | Chilcoat |
| 3,689,037 A | 9/1972 | Payne |
| 3,714,392 A | 1/1973 | Katzman et al. |
| 3,726,793 A | 4/1973 | Bray |
| 3,809,374 A | 5/1974 | Schossow |
| 3,846,295 A | 11/1974 | Gibbs |
| 3,855,371 A | 12/1974 | Morrow et al. |
| 3,867,485 A | 2/1975 | Yeagle |
| 3,892,945 A | 7/1975 | Lerner |
| 3,898,976 A | 8/1975 | Coffman, Jr. |
| 3,990,427 A * | 11/1976 | Clinebell .......... F24F 6/12 126/113 |
| 4,028,526 A | 6/1977 | Schossow |
| 4,031,918 A | 6/1977 | Cagle |
| 4,054,122 A | 10/1977 | Reed |
| 4,132,883 A | 1/1979 | Grime |
| 4,155,001 A | 5/1979 | Schossow |
| 4,158,679 A | 6/1979 | Yeagle |
| 4,169,261 A | 9/1979 | Alpaugh |
| D253,846 S | 1/1980 | Morrow |
| 4,211,735 A | 7/1980 | Berlin |
| D258,609 S | 3/1981 | Vogt |
| 4,257,389 A | 3/1981 | Texidor et al. |
| 4,257,989 A | 3/1981 | Nishikawa |
| 4,287,407 A | 9/1981 | Treiber et al. |
| 4,384,873 A | 5/1983 | Herr |
| 4,463,248 A | 7/1984 | Katzman et al. |
| D280,660 S | 9/1985 | Muchenberger |
| D281,271 S | 11/1985 | Meyer et al. |
| 4,559,789 A | 12/1985 | Rick |
| 4,564,746 A | 1/1986 | Morton et al. |
| D283,265 S | 4/1986 | Preskey et al. |
| 4,589,409 A | 5/1986 | Chatburn et al. |
| 4,626,346 A | 12/1986 | Hall |
| 4,650,586 A | 3/1987 | Ellis, III |
| 4,668,854 A | 5/1987 | Swan |
| 4,675,505 A | 6/1987 | Fischer |
| 4,705,936 A | 11/1987 | Fowler |
| 4,724,104 A | 2/1988 | Kim |
| 4,770,770 A | 9/1988 | Regunathan et al. |
| 4,841,122 A | 6/1989 | Marton |
| 4,869,853 A | 9/1989 | Chen |
| 4,952,779 A | 8/1990 | Eaton-Williams |
| 4,997,553 A | 3/1991 | Clack |
| 5,024,265 A | 6/1991 | Buchholz et al. |
| D320,072 S | 9/1991 | Youngeberg |
| D322,122 S | 12/1991 | Guetersloth et al. |
| 5,075,047 A | 12/1991 | Youngeberg |
| 5,079,950 A | 1/1992 | McKiernan et al. |
| 5,128,035 A | 7/1992 | Clack et al. |
| D338,952 S | 8/1993 | Snow |
| 5,252,260 A | 10/1993 | Schuman |
| 5,256,279 A | 10/1993 | Voznick et al. |
| D342,989 S | 1/1994 | Wallen |
| 5,294,197 A | 3/1994 | Prill et al. |
| 5,317,670 A | 5/1994 | Elia |
| 5,341,986 A | 8/1994 | Galba et al. |
| 5,363,471 A | 11/1994 | Jones |
| 5,406,673 A | 4/1995 | Bradd et al. |
| 5,407,604 A | 4/1995 | Luffman |
| 5,425,902 A | 6/1995 | Miller et al. |
| 5,440,668 A | 8/1995 | Jones |
| 5,445,143 A | 8/1995 | Sims |
| D370,254 S | 5/1996 | Dancs et al. |
| 5,516,466 A | 5/1996 | Schlesch et al. |
| 5,543,090 A | 8/1996 | Morton et al. |
| 5,546,926 A | 8/1996 | Lake |
| 5,598,971 A | 2/1997 | Winther et al. |
| 5,620,503 A | 4/1997 | Miller et al. |
| 5,758,018 A | 5/1998 | Fowler, Jr. |
| 5,851,444 A | 12/1998 | Hansell, Jr. et al. |
| 5,880,438 A | 3/1999 | Parrini et al. |
| 5,906,800 A | 3/1999 | Napierkowski et al. |
| D409,737 S | 5/1999 | Nilsson |
| 5,942,163 A | 8/1999 | Robinson et al. |
| D416,994 S | 11/1999 | Kensok et al. |
| 5,976,363 A | 11/1999 | Monroe et al. |
| 6,019,820 A | 2/2000 | Leverett |
| 6,053,482 A | 4/2000 | Glenn et al. |
| 6,078,729 A | 6/2000 | Kopel |
| 6,092,794 A | 7/2000 | Reens |
| 6,103,125 A | 8/2000 | Knepper |
| 6,120,682 A | 9/2000 | Cook |
| 6,148,144 A | 11/2000 | Milanese |
| 6,190,558 B1 | 2/2001 | Robbins |
| 6,195,013 B1 | 4/2001 | Robinson |
| 6,253,964 B1 | 7/2001 | Rainey |
| 6,260,514 B1 | 7/2001 | Ehling et al. |
| 6,286,181 B1 | 9/2001 | Kasper et al. |
| 6,339,952 B1 | 1/2002 | Potter et al. |
| 6,354,572 B1 | 3/2002 | Menassa |
| 6,375,849 B1 | 4/2002 | Crabtree et al. |
| D456,887 S | 5/2002 | Zlotnik |
| 6,394,427 B1 | 5/2002 | Guetersloh et al. |
| 6,397,001 B1 | 5/2002 | Montagnino et al. |

(56) References Cited

U.S. PATENT DOCUMENTS

| | | | |
|---|---|---|---|
| D458,356 S | 6/2002 | Redner et al. | |
| 6,398,196 B1 | 6/2002 | Light et al. | |
| 6,560,408 B2 | 5/2003 | Glucksman et al. | |
| 6,588,734 B2 | 7/2003 | Redner et al. | |
| D486,896 S | 2/2004 | Long et al. | |
| 6,715,743 B2 | 4/2004 | Zhang | |
| 6,727,822 B2 | 4/2004 | Chamberlin et al. | |
| D492,759 S | 7/2004 | Yoshida | |
| 6,773,588 B2 | 8/2004 | Beeman et al. | |
| 6,810,732 B2 | 11/2004 | Shon | |
| 6,845,755 B2 | 1/2005 | Cook et al. | |
| 6,846,407 B2 | 1/2005 | Anderson et al. | |
| D516,192 S | 2/2006 | Kang | |
| D516,689 S | 3/2006 | Salmon et al. | |
| D519,622 S | 4/2006 | Cocchi | |
| 7,043,974 B2 | 5/2006 | Grossman et al. | |
| 7,066,452 B2 | 6/2006 | Rotering et al. | |
| 7,068,924 B2 | 6/2006 | Watanabe et al. | |
| D532,497 S | 11/2006 | Engel et al. | |
| D540,819 S | 4/2007 | Schmitt et al. | |
| D540,929 S | 4/2007 | Kowis et al. | |
| D554,246 S | 10/2007 | Seelig et al. | |
| 7,281,498 B2 | 10/2007 | Besik | |
| D557,784 S | 12/2007 | Stead | |
| 7,389,688 B1 | 6/2008 | Vander Horst | |
| D573,703 S | 7/2008 | Gosselin et al. | |
| 7,434,741 B2 | 10/2008 | Helt et al. | |
| D593,190 S | 5/2009 | Glass | |
| D596,728 S | 7/2009 | Campbell et al. | |
| D598,526 S | 8/2009 | Pitchford et al. | |
| D600,252 S | 9/2009 | Yan et al. | |
| 7,623,771 B2 | 11/2009 | Lentz et al. | |
| 7,673,855 B2 | 3/2010 | Anderson et al. | |
| 7,673,858 B2 | 3/2010 | Anderson et al. | |
| 7,673,859 B2 | 3/2010 | Novotny et al. | |
| 7,766,310 B2 | 8/2010 | Wolff et al. | |
| 7,826,725 B2 | 11/2010 | Wolff et al. | |
| D630,310 S | 1/2011 | Beland et al. | |
| D631,145 S | 1/2011 | Beland et al. | |
| 7,904,608 B2 | 3/2011 | Price | |
| 8,079,575 B2 | 12/2011 | Novotny et al. | |
| 8,128,069 B2 | 3/2012 | Reens | |
| 8,231,112 B2 | 7/2012 | Cao et al. | |
| 8,292,270 B2 | 10/2012 | Terlson et al. | |
| 8,302,943 B2 | 11/2012 | Wang et al. | |
| 8,376,322 B2 | 2/2013 | Hoglund | |
| 8,490,951 B2 | 7/2013 | Feldstein et al. | |
| 8,794,603 B2 | 8/2014 | Quam et al. | |
| 8,833,739 B2 | 9/2014 | Wang et al. | |
| 8,991,794 B1* | 3/2015 | Boonstra | B01D 39/06 261/5 |
| 9,004,461 B2 | 4/2015 | Schwendinger et al. | |
| 9,091,497 B2 | 7/2015 | Schwendinger et al. | |
| 9,174,017 B2 | 11/2015 | Potharaju et al. | |
| 9,360,261 B2 | 6/2016 | Hashimoto | |
| 9,406,666 B2 | 8/2016 | Naito | |
| 9,806,705 B2 | 10/2017 | Landry | |
| 9,822,990 B2* | 11/2017 | Peczalski | F24F 13/22 |
| 10,508,820 B2* | 12/2019 | Quadroni | B01F 3/04021 |
| 2002/0100716 A1 | 8/2002 | Bosko | |
| 2003/0133842 A1* | 7/2003 | Williams | C40B 40/04 422/400 |
| 2003/0146757 A1* | 8/2003 | Aguero | B01L 3/0268 324/453 |
| 2003/0230522 A1 | 12/2003 | Pavel | |
| 2004/0084787 A1 | 5/2004 | Williams et al. | |
| 2005/0150491 A1 | 7/2005 | Chen | |
| 2005/0212152 A1* | 9/2005 | Reens | F24F 6/12 261/81 |
| 2006/0027267 A1 | 2/2006 | Fritze | |
| 2007/0187530 A1* | 8/2007 | Byrd | A61L 9/14 239/398 |
| 2007/0254255 A1 | 11/2007 | Neville et al. | |
| 2008/0079177 A1 | 4/2008 | Schuld | |
| 2008/0131103 A1 | 6/2008 | Nordmann | |
| 2008/0173032 A1 | 7/2008 | Kammerzell et al. | |
| 2010/0001097 A1 | 1/2010 | Spivak | |
| 2011/0203456 A1 | 8/2011 | Hakansson | |
| 2012/0145255 A1* | 6/2012 | Spano, Jr. | A61L 9/14 137/87.03 |
| 2013/0139996 A1 | 6/2013 | Hashimoto | |
| 2013/0327156 A1 | 12/2013 | Peczalski et al. | |
| 2014/0007698 A1 | 1/2014 | Peczalski et al. | |
| 2014/0199484 A1 | 7/2014 | Larson et al. | |
| 2015/0021796 A1 | 1/2015 | Peczalski et al. | |
| 2017/0134214 A1 | 5/2017 | Sethuraman et al. | |
| 2018/0066862 A1 | 3/2018 | Peczalski et al. | |

FOREIGN PATENT DOCUMENTS

| | | |
|---|---|---|
| JP | 62095189 A | 5/1987 |
| JP | 63270592 A | 11/1988 |
| JP | 1003442 A | 1/1989 |
| JP | 5296505 A | 11/1993 |
| JP | 7293953 A | 11/1995 |
| JP | 11300341 A | 11/1999 |
| JP | 2003314865 A | 11/2003 |
| JP | 2004293936 A | 10/2004 |
| WO | 2014066882 A1 | 5/2014 |

OTHER PUBLICATIONS

"Photograph of Remote Nozzle for Elite Steam Humidifier, Manufactured by GeneralAire," 1 page, Sep. 25, 2006.

"Pictures of Hayward Universal StopCock Valves," 3 pages, Oct. 29, 2007.

AB SIBE International, "Pure Water for Air Humidification Systems," 2 pages, 1999.

Aprilaire, "Humidifiers, Owner's Manual for Models 110, 112, 220, 224, 350, 360, 440, 445, 448, 558, 560, 568, 760, and 768," 20 pages, Feb. 2005.

Aprilaire, "Humidifiers, Owner's Manual for Models 350, 360, 400, 400M, 500, 500M, 600, 600M, 700, and 700M," 11 pages, Jun. 2010.

Aprilaire, "Model 800 Residential Steam Humidifier, Installation and Maintenance Instructions," 16 pages, May 2010.

Armstrong, "HumidiClean Series HC-4000 Humidifier," 10 pages, Oct. 1999.

AutoFlo, "Electronics Steam Unit-Power Humidifier Models S2000 and S2020 Installation Instructions and Owner's Manual," 12 pages, 1999-2003.

AutoFlo, "Electronics Steam Unit-Power Humidifier Models S2000 and S2020 Installation Instructions and Owner's Manual," 11 pages, prior to Aug. 7, 2003.

Carel USA, "HomeSteam Elite Residential Whole House Humidifier," downloaded from http://www.carelusa.com/homesteam.htm, 3 pages, printed Jul. 25, 2003.

Carel, "HomeSteam Elite Residential Steam Humidifier, Installation, Operating, and Maintenance Manual," 24 pages, prior to Aug. 7, 2003.

Carel, "HumiSteam X-Plus, Steam Humidifiers, User Manual," 60 pages, Mar. 16, 2011.

Carrier, "Humidifiers, Homeowner's Manual," 8 pages, 1998.

Dristeem, "XT Series Electrode Steam Humidifier, Installation, Operation, and Maintenance Manual," 72 pages, 2009.

GeneralAire, "Elite Steam Residential Steam Humidifiers, User Manual," 28 pages, prior to Oct. 11, 2007.

GeneralAire, "Model Elite Steam Humidifiers, User Manual," Revision 4.0, 48 pages, Mar. 2, 2015.

Hayward Flow Control Systems, "Control Valves," 2 pages, prior to Oct. 31, 2007.

Honeywell, "HE225 ByPass Flow-Through Humidifier," 8 pages, Jun. 2010.

Honeywell, "HE360 Powered Flow-Through Humidifier, Owner's Guide," 8 pages, 1997.

Honeywell, "HE420A,B and HE460A,B Steam Power Humidifiers, Product Data," 12 pages, 1998.

(56) References Cited

OTHER PUBLICATIONS

Honeywell, "HM700A1000 Electrode Steam Humidifier, Installation Instructions," 28 pages, Nov. 2015.
Honeywell, "The Best Humidifier Available," 2 pages, prior to Aug. 7, 2003.
http://www.ewccontrols.com/steam_humidifer.htm, "Steam Humidifier, Models S2000 and S2020," 2 pages, May 3, 2006.
http://www.michiganair.com/newsletters/2011-1/section3.htm, "Tis the Season to Humidify," 4 pages, printed Oct. 12, 2012.
http://www.powerspecialties.com/humidiclean.htm, "HumidiClean Humidifier, The Ionic Bed. The Final Resting Place for Ordinary Humidifiers," 4 pages, printed Nov. 23, 2002.
http://www.powerspecialties.com/humidiclean_specifcat.htm, "Humidiclean Suggested Specifications," 4 pages, prior to Aug. 7, 2003.
http://www.skuttle.com/f601.html, "Skuttle Model 60 Humidifier Flushing Timer," 2 pages, printed May 3, 2006.
Humidity Source, "ElectroVap MC2, Electrode Steam Humidifier, Technical Manual," 49 pages, downloaded Nov. 23, 2016.
JS Humidifiers PLC, "Condair Mk5 Resistive Steam Humidifier," 4 pages, prior to Oct. 12, 2012.
JS, "Calomax Steam Humidifier Range," 2 pages, Jul. 2002.
JS, "PureFlo Water Treatment for Humidifiers," 2 pages, prior to Feb. 24, 2017.
Marshall-George, "Electrode vs Resistive Steam Humidifiers," downloaded from http://www.condairco.uk/knowledge-hub/electrode-vs-resistive-humidifiers, 5 pages, printed Nov. 23, 2016.
Nortec, "NH-EL Series Engineering Manual," 59 pages, May 2014.
Nortec, "NHRS Series Resistive Element Steam Humidifier, Engineering Manual," Manual No. H-104, 26 pages, Feb. 18, 2008.
Nortec, "Nortec's GS Series, Condensing High Efficiency," 8 pages, prior to Aug. 7, 2003.
Nortec, "RH Series," 2 pages, downloaded Nov. 23, 2016.
Omega Engineering, "New Conductivity Level Switches," 5 pages, prior to Oct. 18, 2007.
Pure Humidifier, "Standard Water EC Series Electric Humidifier, Installation Instructions, Operation and Maintenance Manual," 24 pages, Jul. 13, 2015.
Skuttle Indoor Air Quality Products, "Model 60-Series High-Capacity Steam Humidifiers (Models 60-1, F60-1, 60-2 and F60-2)," 2 pages, prior to Aug. 7, 2003.
Standex Electronics, "Fluid Level Proximity, and Motion Sensors," 16 pages, prior to Oct. 18, 2007.
Standex Electronics, "LS300 Series—Conductive Fluid Level Sensor," Preliminary Data Sheet 2003, 2 pages, printed Oct. 18, 2007.
Hue Design Studio, "Comfortmist Cyclone, Aesthetic Model Color, Finish & Material Guide," Revision 01, 8 pages, Sep. 14, 2016.
Hue Design Studio, "Comfortmist Pill, Aesthetic Model Color, Finish & Material Guide," Revision 01, 9 pages, Sep. 14, 2016.
Hue Design Studio, "Comfort Mist Models," CMF Revision 01, 9 pages, Sep. 14, 2016.

\* cited by examiner

| Nebulizer Flow mL/min | | |
|---|---|---|
| Frequency | 100 kHz | 104 kHz |
| #1 | 0.4105 | 1.1298 |
| #2 | 0.4795 | 1.4822 |
| #3 | 1.1693 | 1.0347 |
| #4 | 0.7313 | 1.4067 |
| #5 | 0.2837 | 0.9905 |
| #6 | 1.6224 | 2.1841 |

FIG. 7

Wall of nebulizer head 151  161  153  161  151

Air flow →

FIG. 8

153  162

Wall of nebulizer head 151  151

Air flow eddies

FIG. 13

HUMIDIFIER SYSTEM

This Application claims the benefit of U.S. Provisional Application No. 62/408,668, filed Oct. 14, 2016. U.S. Provisional Application No. 62/408,668, filed Oct. 14, 2016, is hereby incorporated by reference.

This Application is a continuation-in-part of U.S. patent application Ser. No. 14/334,865, filed Jul. 18, 2014 (issued as U.S. Pat. No. 9,822,990 on Nov. 21, 2017), which claims the benefit of U.S. Provisional Application No. 61/856,484, filed Jul. 19, 2013. U.S. patent application Ser. No. 14/334,865, filed Jul. 18, 2014, is hereby incorporated by reference. U.S. Provisional Application No. 61/856,484, filed Jul. 19, 2013, is hereby incorporated by reference.

BACKGROUND

The present disclosure pertains to heating, ventilation and air conditioning. Particularly, the disclosure pertains to humidifiers, and more particularly to techniques of humidifying.

SUMMARY

The disclosure reveals a system that may provide effective and efficient introduction of water droplets into an air flow. The water droplets are sufficiently small so as to evaporate primarily before leaving the mixing enclosure where the droplets are injected by spray nozzles. Large droplets are kept to a minimum, thus reducing condensation and water accumulation to a very small amount. An amount of water usage may be significantly less than that of a conventional evaporative humidifier of the same capacity. The present system may be placed in an enclosure that can readily replace other conventional evaporative humidifiers in enclosures. The present enclosure and system may be installed in lieu of a conventional enclosure and evaporative humidifier with minimal effort. The present enclosure has features that facilitate droplet to air mixing, viewing, humidification, and testing. In permissible situations, the present system may replace a conventional system but retain the conventional enclosure.

BRIEF DESCRIPTION OF THE DRAWING

FIG. 1 is a diagram of an illustrative example of a system for introducing very small droplets into a flow of air;

FIGS. 2*a*, 2*b*, 2*c* and 2*d* are diagrams of various configurations of arrays for spray nozzles;

FIG. 3 is a diagram of a nebulizer that may be used as a spray nozzle;

FIGS. 4*a* and 4*b* are diagrams that indicate the water flow rates from the nebulizers relative to frequency;

FIG. 5 is a diagram of a self-adjusting drive circuit for a nebulizer;

FIGS. 6*a* and 6*b* are diagrams that illustrate a design for obtaining a laminar flow of air for injection of droplets;

FIGS. 7 and 8 are diagrams that show a couple of ways in which nebulizers may be mounted on a wall of a wing shaped nebulizer head;

FIGS. 9 and 10 are diagrams that illustrate a pill type enclosure of a humidifier;

FIGS. 11 and 12 are diagrams that illustrate a round type enclosure of a humidifier;

Figure 13:
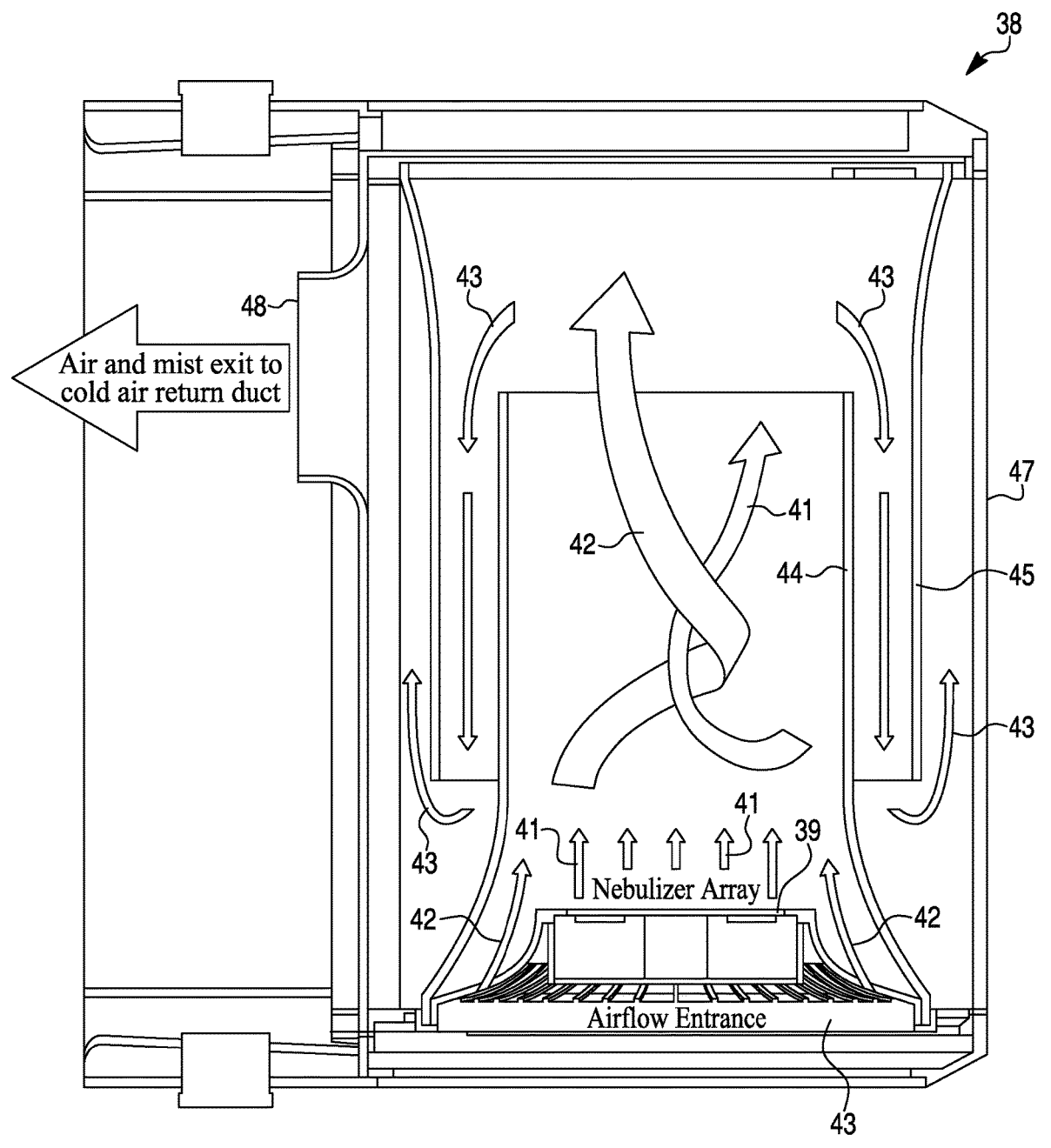

FIGS. 13 and 14 are diagrams that that illustrate a cyclone type enclosure of a humidifier;

FIG. 15 is a diagram of a model "A" humidifier enclosure;

FIG. 16 is a diagram of the humidifier enclosure without front shell thereby revealing some internal components in the enclosure;

FIG. 17 is a diagram revealing an air flow through the enclosure;

FIG. 18 is a diagram of a back view of the enclosure;

FIG. 19 is a diagram showing an emitter housing with emitters and one or more LEDs for the enclosure;

FIG. 20 is a diagram of an illustrative example of a system for humidifying;

FIG. 21 is a diagram of another illustrative example of a system for humidifying; and FIG. 22 is a diagram of an illustrative example of an approach for humidifying.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

FIG. 1 is a diagram of an illustrative example of humidifying system 55. Arrays 56, 57 and 58 may contain spray units 59. Water may be fed to a manifold device 61 that distributes the water to spray units 59. The water may come from a supply 62. If the water is not truly clean, like distilled water, the water may go to a purifier 63 for cleansing. Purifier 63 may use, for example, reverse osmosis for obtaining clean water from ordinary water, such as tap or faucet water from a well or city supply. The water is controlled relative to pressure with a pressure control module 64. The water may flow from pressure control 64 to a unit 61 via a water conveyance line or pipe 65 to distribution or manifold device 61. The water may be provided to the spray units of array 56, 57 and 58. Pressure control unit 64 may have an input from a controller 60 that indicates an amount of pressure for the water in pipe 65 to the spray units 59. For instance, a pressure may be 2.5 inches of water from a top of a reservoir under atmospheric conditions to a spray unit 59.

A line 66 from controller 60 may provide an actuation signal to spray units 59, which actuates or turns on one or more of spray units 59. Spray units 59 may be turned on separately according to array. Array 56, of spray units 59 may be on for a given period of time or have a duty cycle while the other arrays 57 and 58 are turned off or inactive. Arrays 57 and 58 of spray units 59 may, in turn, be actuated while the other two arrays are turned off or inactive. The spray units may be actuated individually, in a pattern, or a sequence, of various kinds. Arrays 56, 57 and 58 may be removed and cleaned, repaired or replaced, as needed. There may be more or less than three arrays and there may be more or less than six spray units in each array.

System 55 may be placed in an enclosure 66 where water droplets 68 from spray units 59 are mixed in with air 67, from duct 71, moving past spray units 59. Droplets 68 may be small enough such that the droplets 68 result in a vapor that moves with air 67 through enclosure 66 and to an air return duct 72. Spray units 59 may eject water droplets 68 up, down or sideways relative to enclosure 66. The droplets 68 may be ejected perpendicular, parallel or at other angles relative to a flow of air 67.

Duct 71 may be the warmer and/or higher pressure duct in comparison to air return duct 72, which would accommodate vaporization of droplets 68 and movement of air 67 from duct 71 to duct 72. The design may also work with reverse airflow configurations to accommodate installations where the bypass humidifier was installed on the high pressure duct, with the bypass attached to the low pressure, resulting in backwards airflow.

Enclosure 66 may also incorporate one or more components of pressure control 64, controller 60, purifier 63, and other items as desired.

Figure 3:
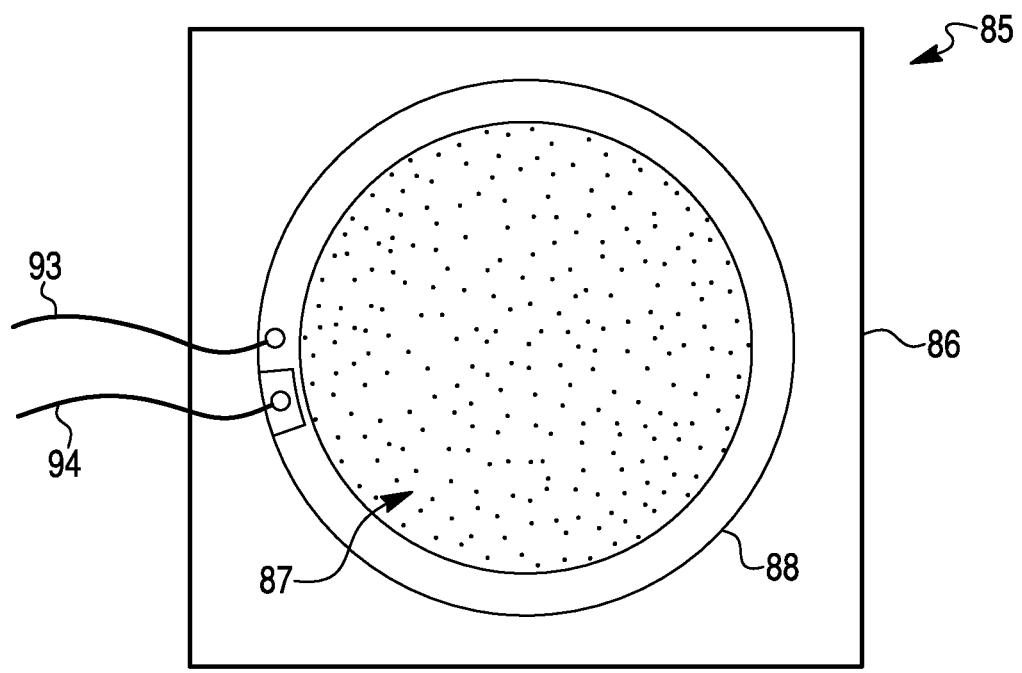
Figures 4A, 4B:
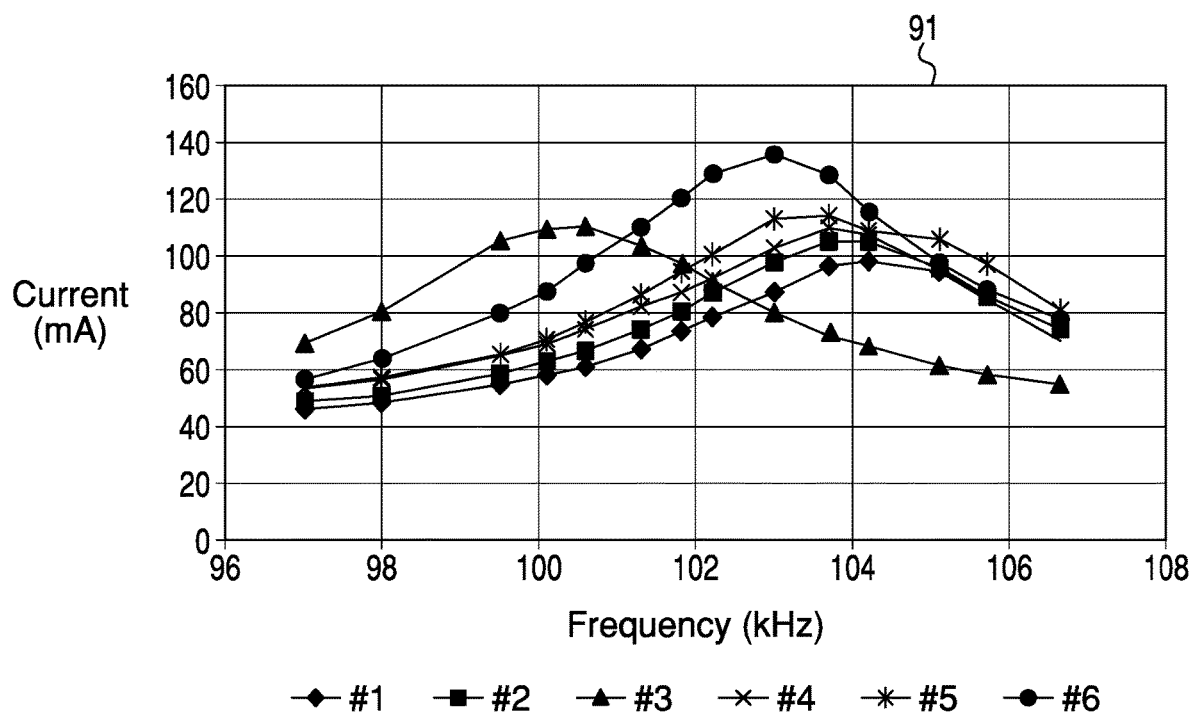
Figure 5:
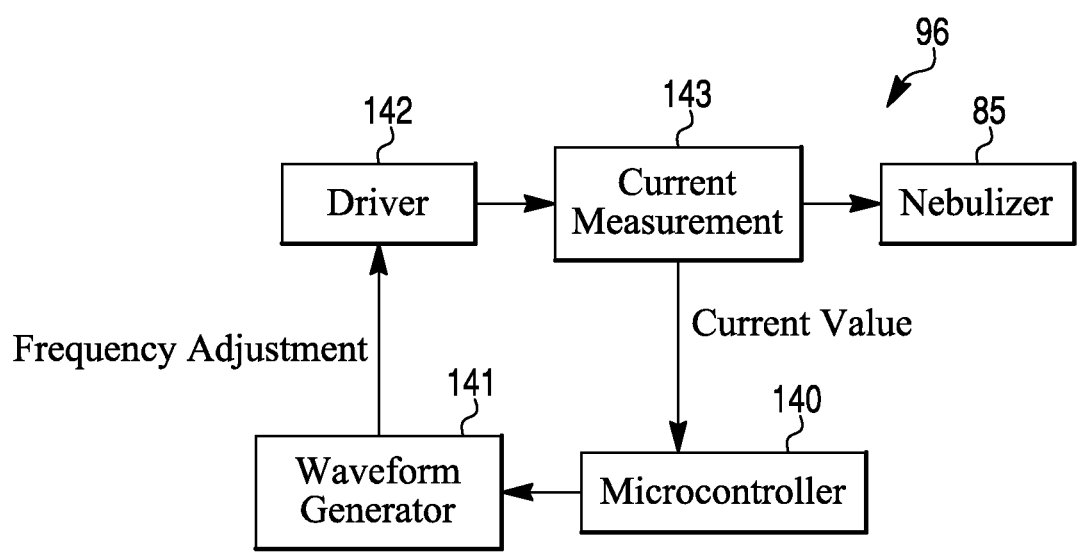
Figure 6B:
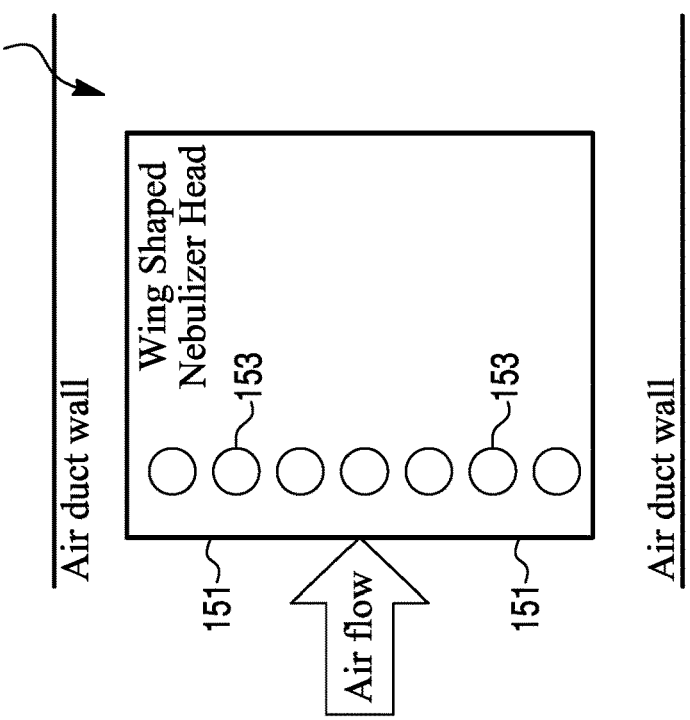
Figure 6A:
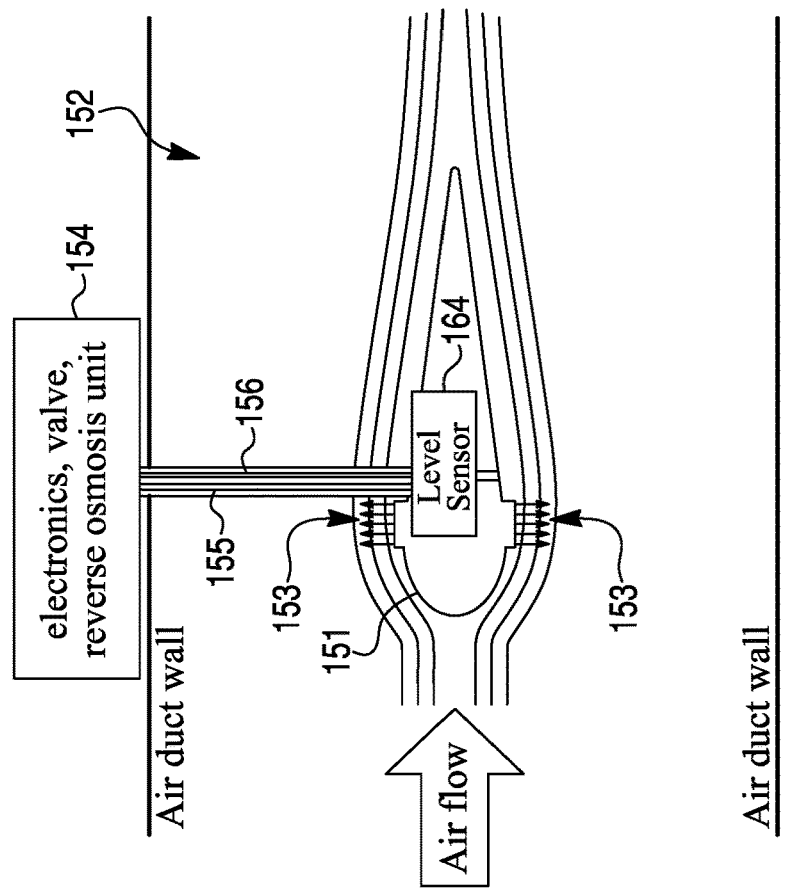
Figure 9:
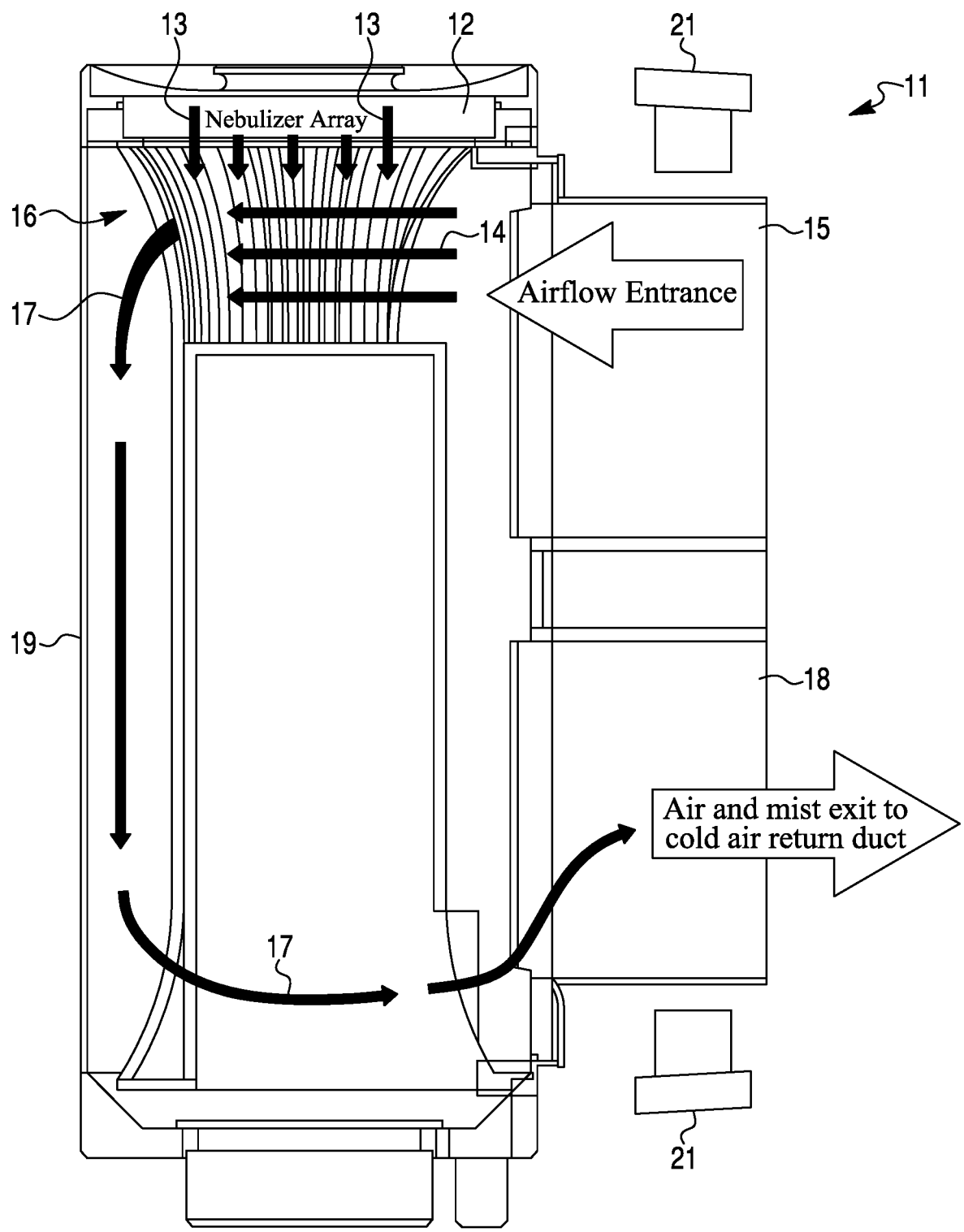
Figure 10:
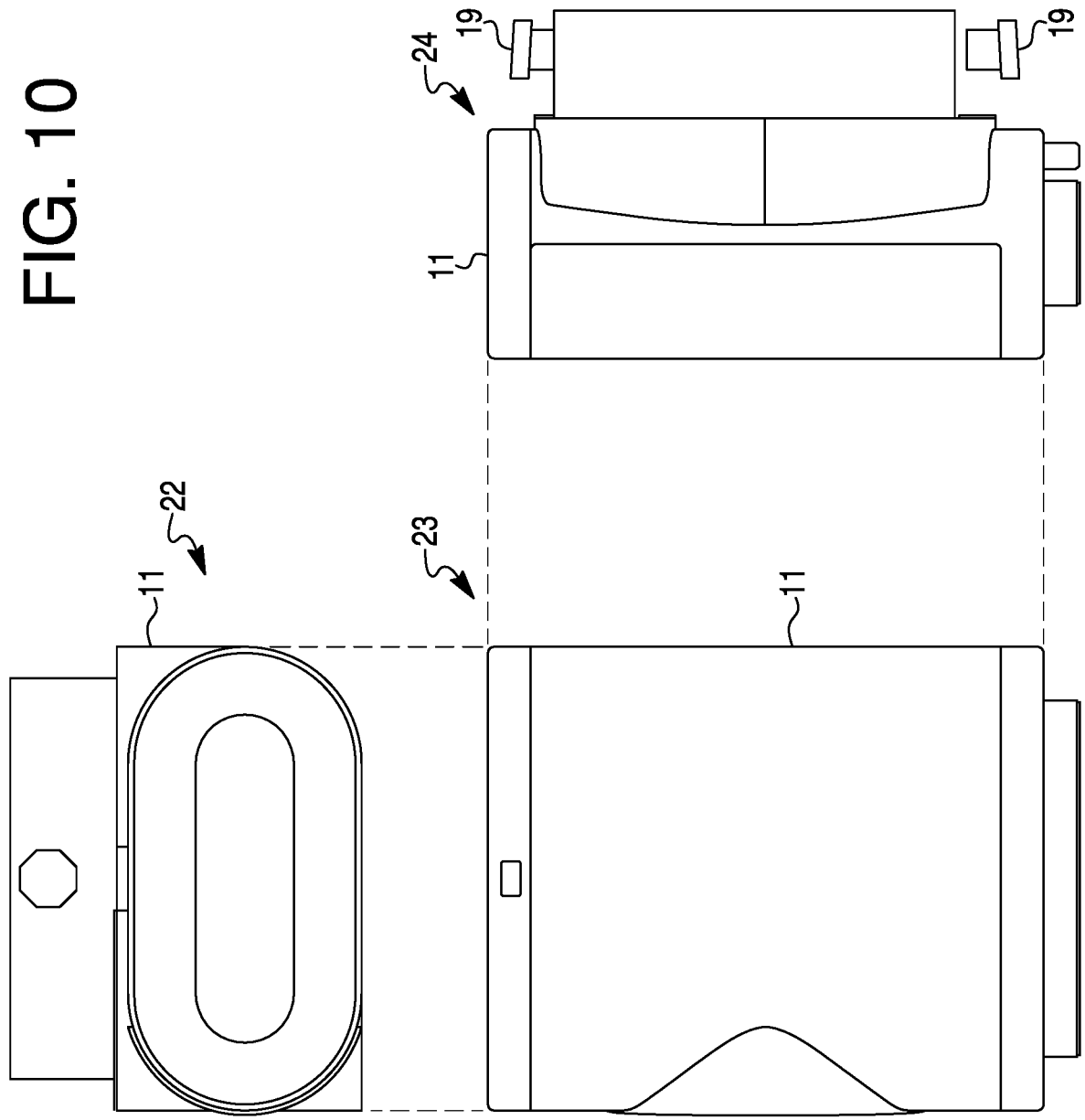
Figure 11:
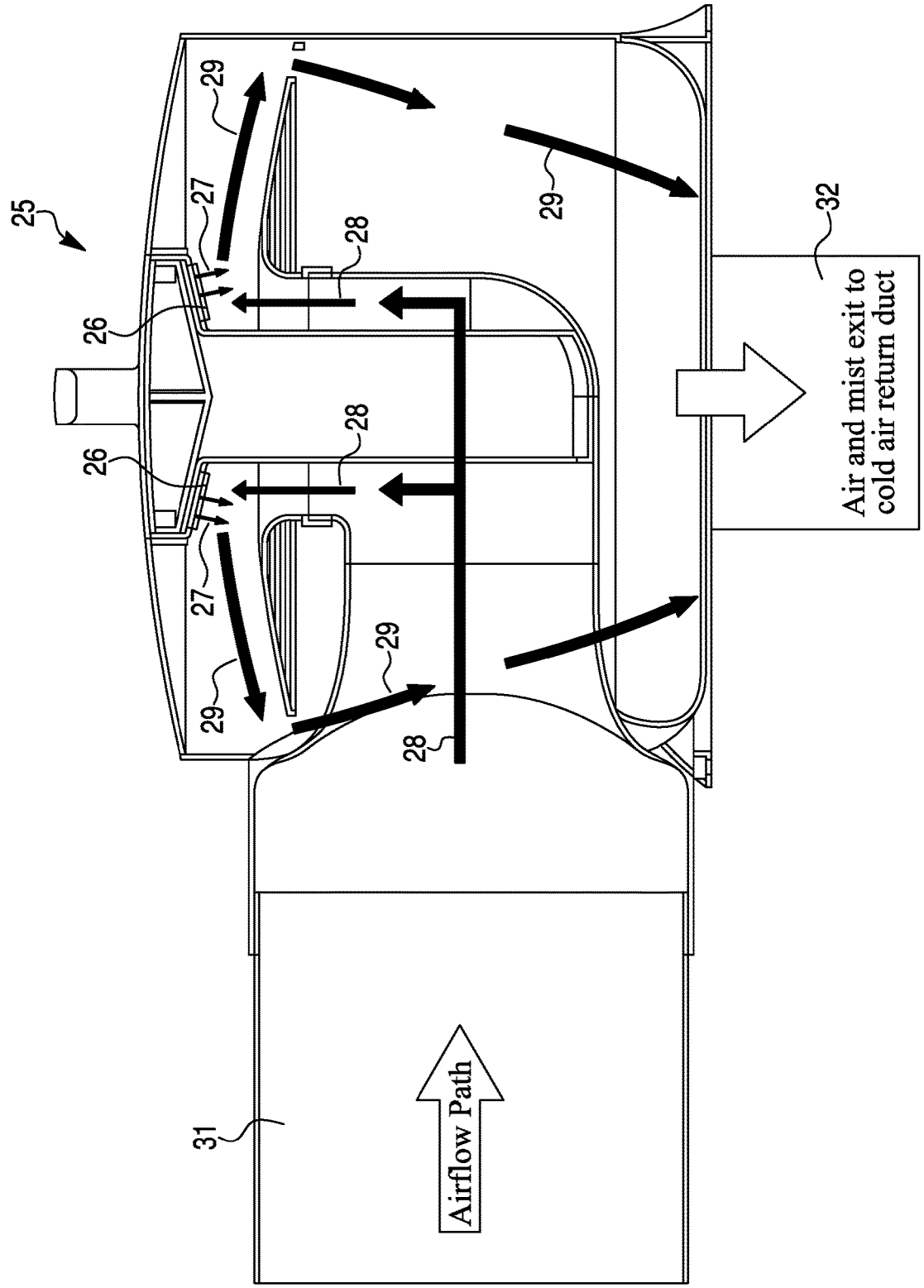
Figure 12:
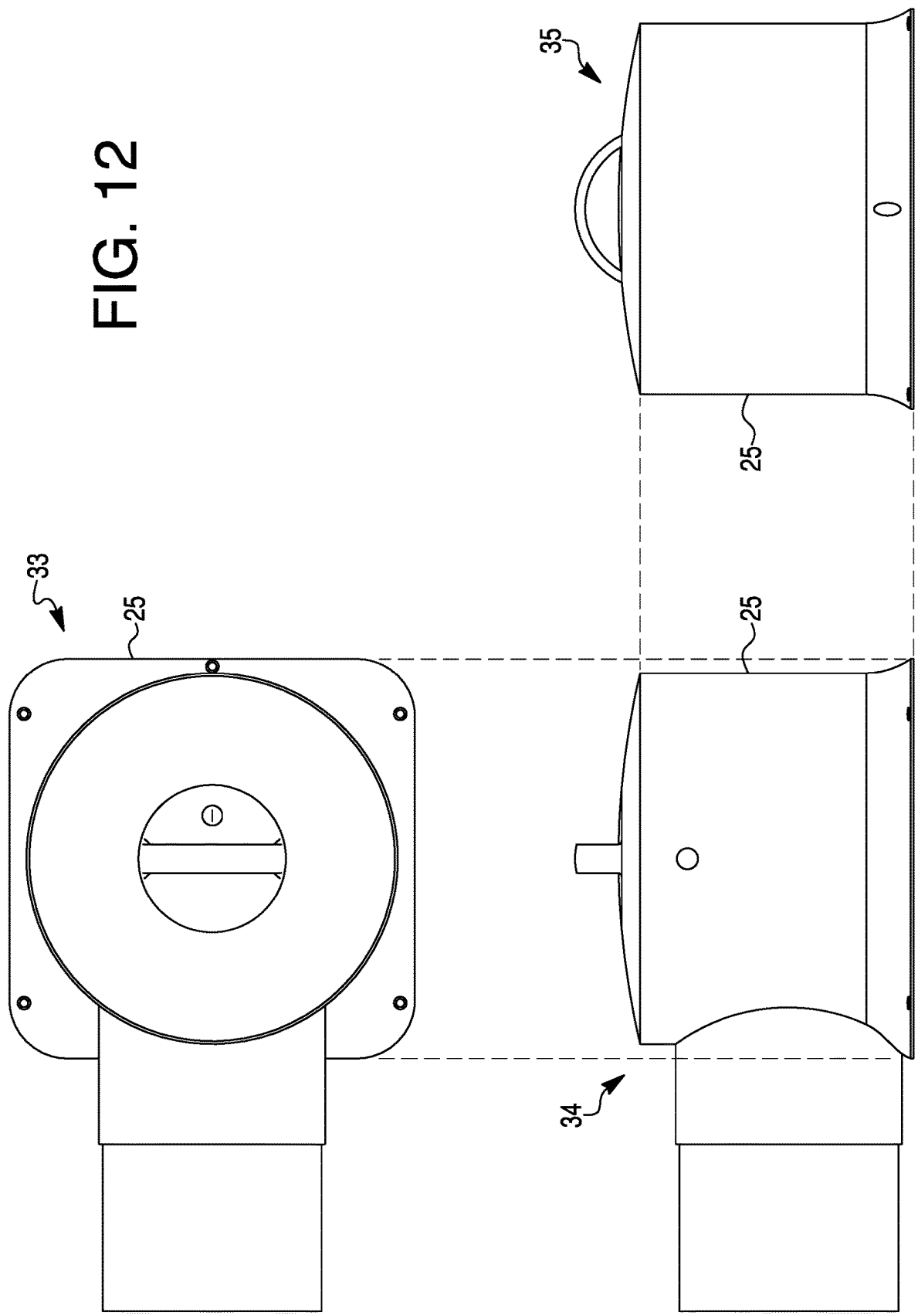
Figure 14:
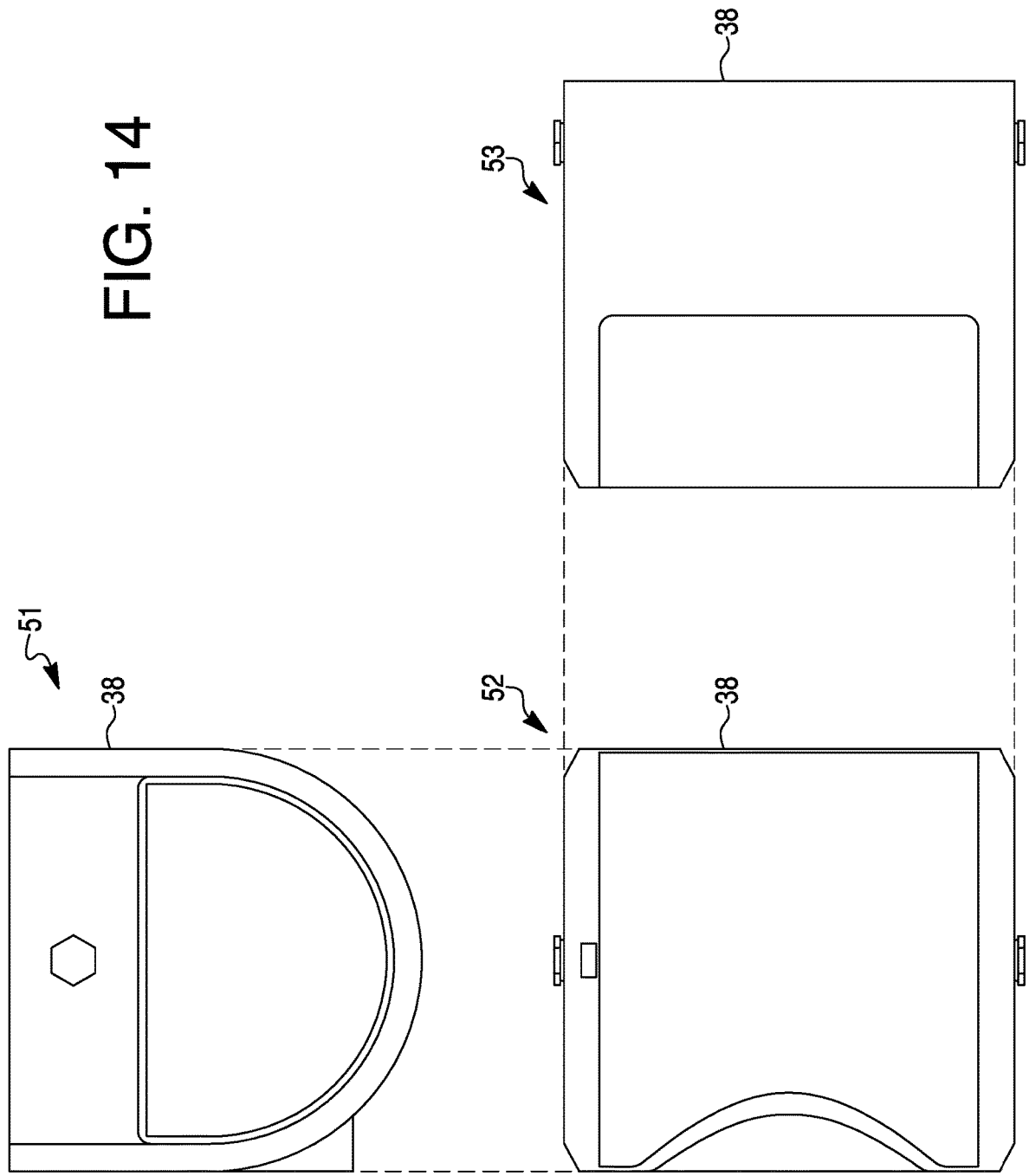
Figure 15:
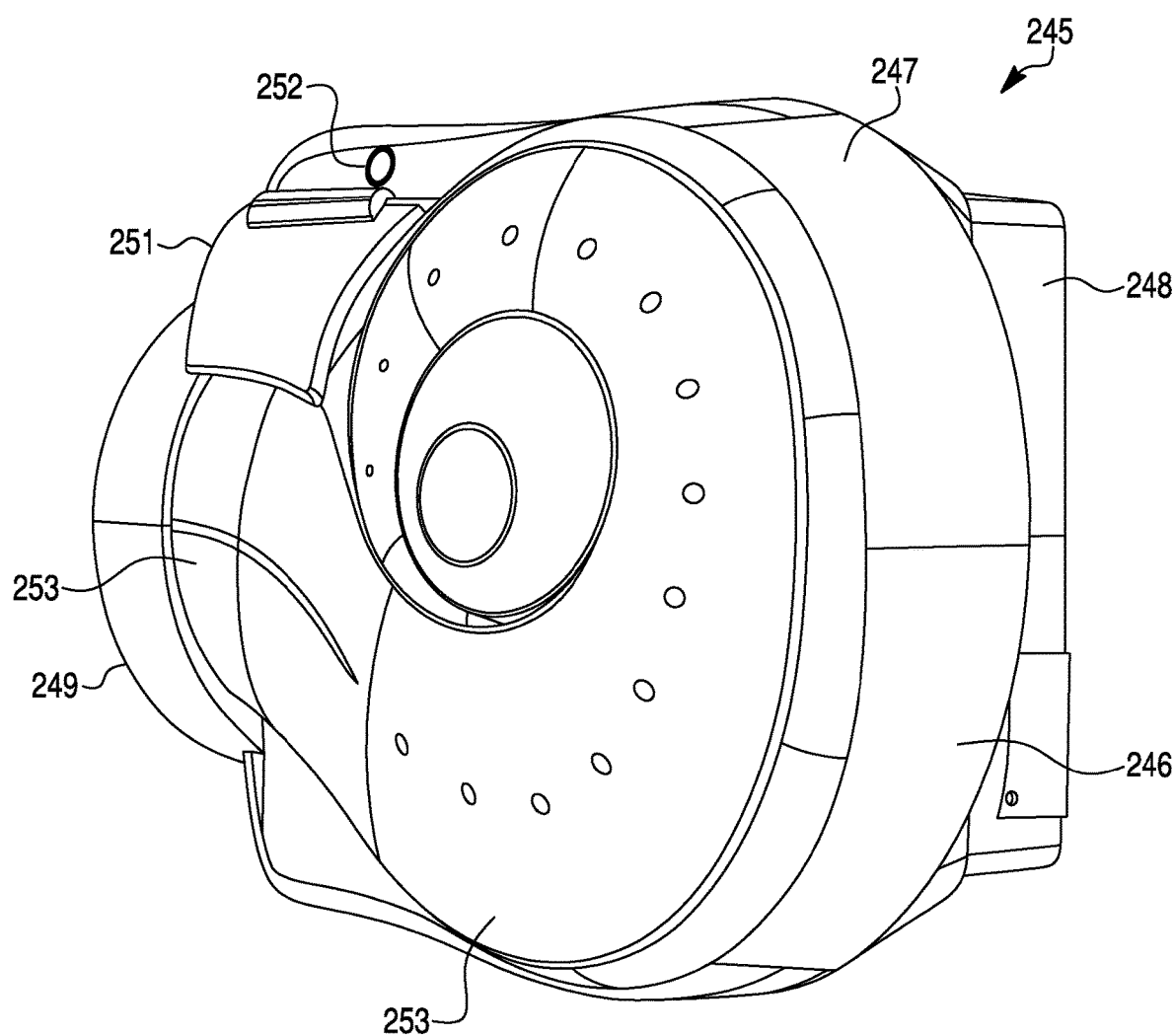
Figure 16:
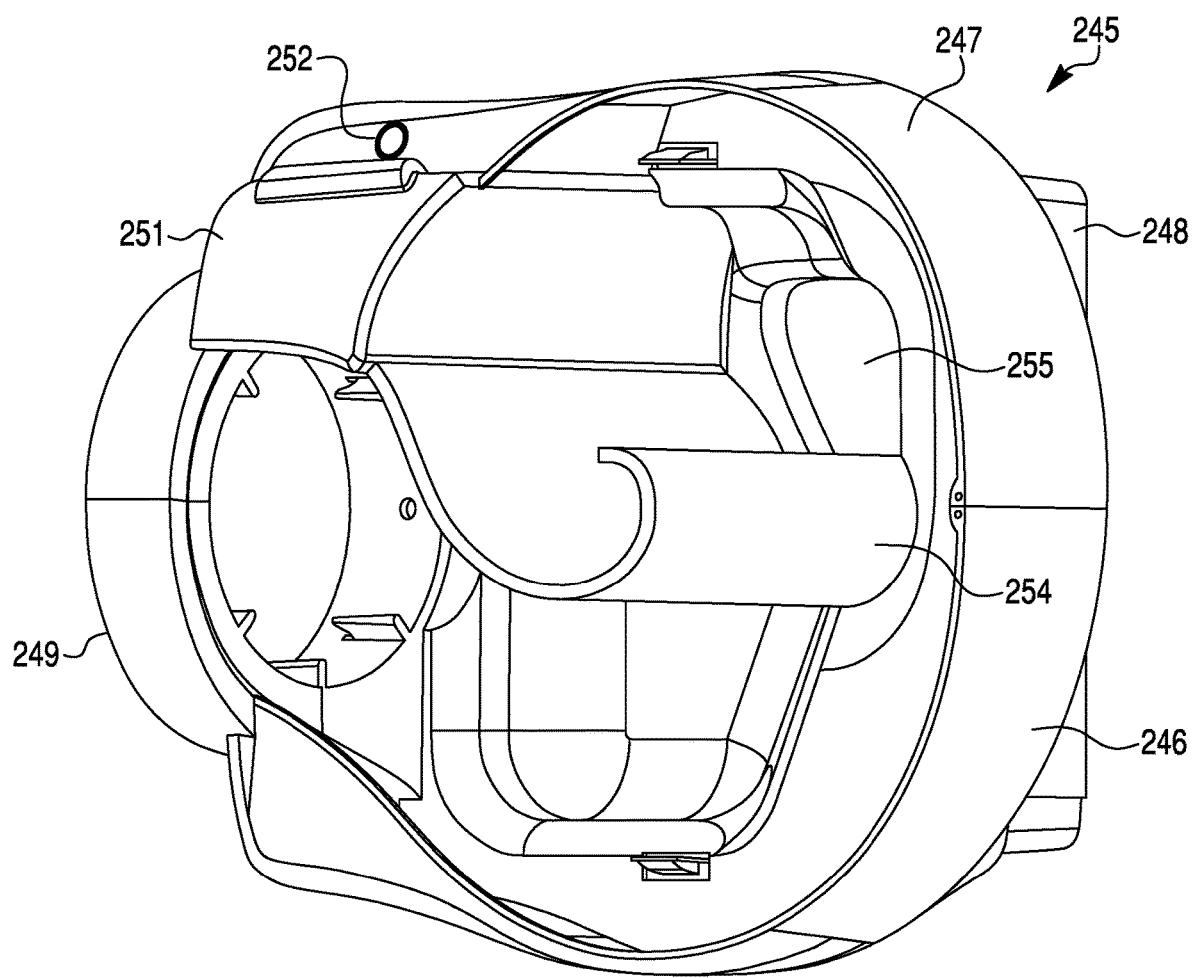
Figure 17:
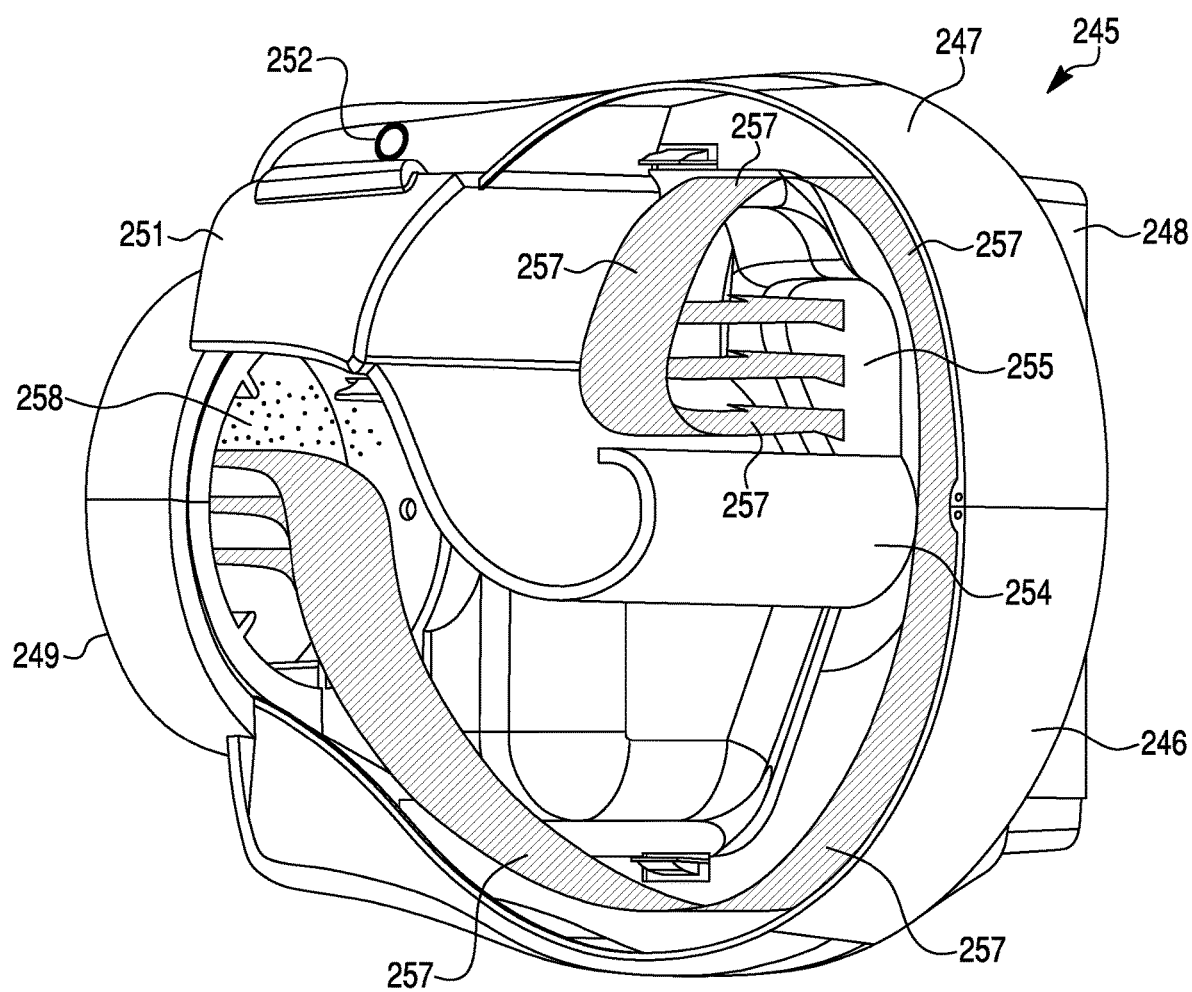
Figure 18:
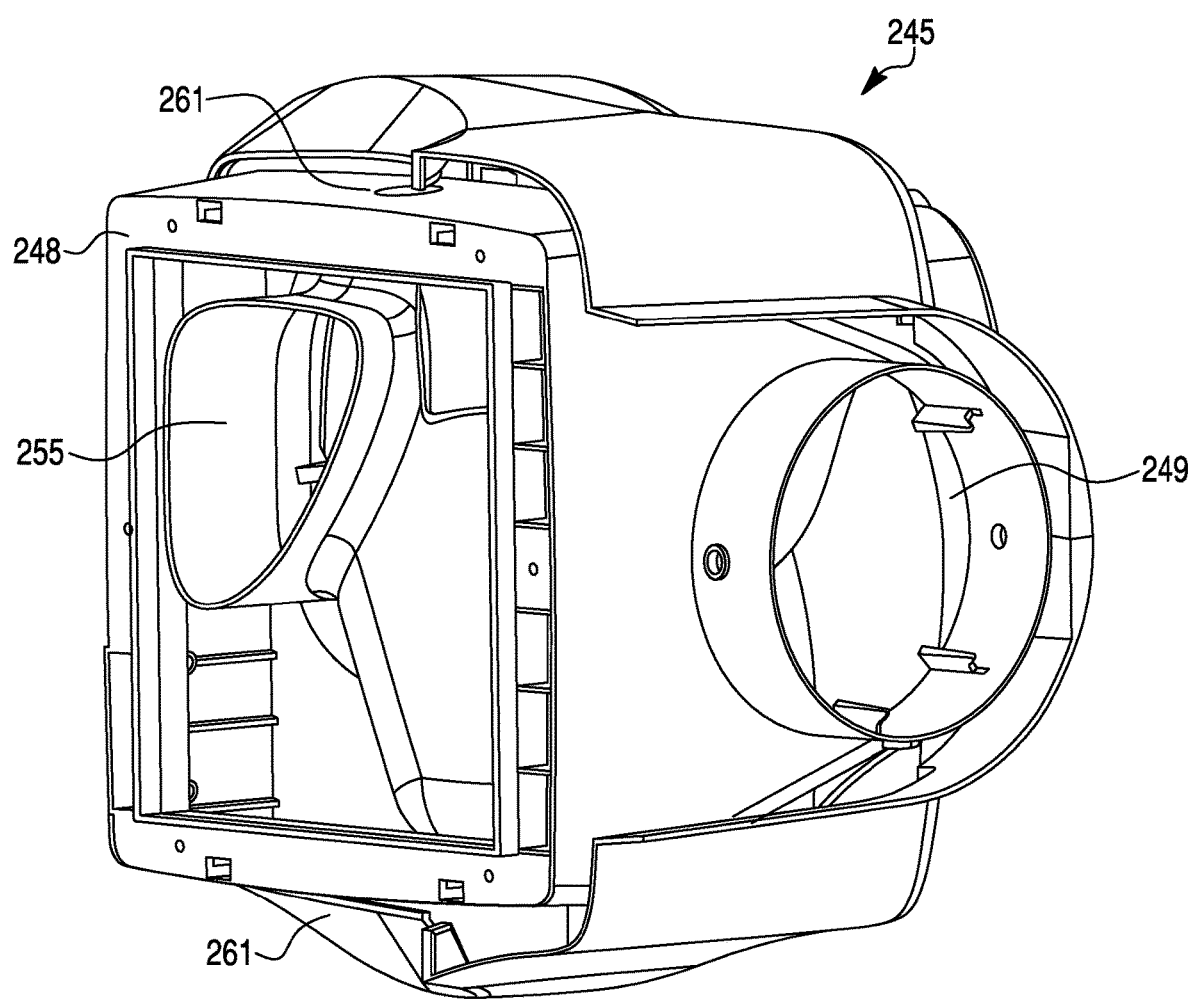
Figure 19:
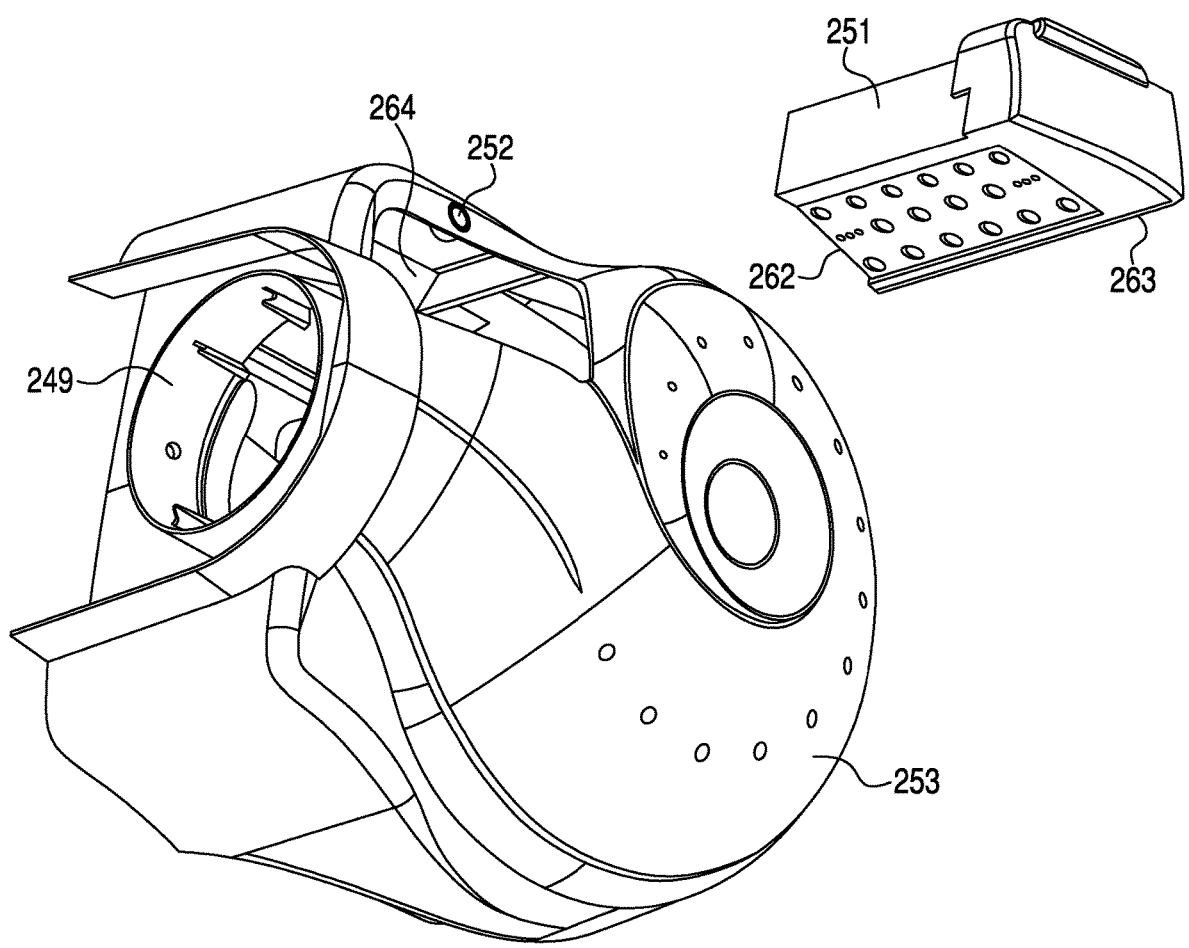

Enclosure 66 and its components, as noted herein, may replace current humidifier systems in present HVAC systems in homes and buildings in a very easy manner. Enclosure 66 may be designed to fit in as a replacement having the same size duct connections, mounting fasteners, water, electrical connections, and more as desired. A tool-like clamp design may be used to attach enclosure 66 to an existing opening in existing ducts. A strap that wraps around an existing humidifier enclosure or body may be used to secure the new present humidifying system 55 to the ducts. These or other configurations are anticipated such that the unit may be attached securely using existing openings and/or ducts or fixtures without the use of additional tools. In permissible situations, the present system may replace a conventional system or a portion of elements of the existing system such as a cover and/or air hydration elements like evaporative pads and frames or steam generating elements, but retain the existing or conventional enclosure.

Spray units 59 or emitters may be monitored with associated detectors, or other ways, so as to provide a notification that an array containing a poor spray unit should be removed, repaired or replaced. The water for the spray units 59 may be monitored to provide a notification in the event that purifier 63 is not working at or near optimal performance, and that repair or replacement is needed, such as, e.g., a reverse osmosis filter.

Enclosure 66 may be designed to recapture droplets 68 that have not evaporated and drain them via a drain 73 to prevent their entry to low pressure or return duct 72.

Flow of air 67 may be circulated in a cyclonic vortex so that water droplets 68 are displayed in a way, such as through a clear window on enclosure 66 or other disclosure, that lets one witness water being put into air 67 and to keep droplets from attaching to surfaces near spray unit 59. There is a benefit in that since there is an intention to prevent any significant amount of unevaporated water from entering the air duct, the vortex approach may offer an effectively extended evaporation distance that can help increase the amount of evaporation that occurs. In addition, the vortex may serve as a cyclonic separator that can drive any large droplets that might occur on the sidewalls and let them drain away in a controlled way instead of injecting them into the air duct.

The arrays of spray units 59 may be grouped in a manner that the arrays can be enabled selectively, so that for any time interval, only one array is enabled, and after a number of time intervals equal to, for instance, the number of arrays, each spray unit in the respective array will have to be operating for the same length of time as each of the other arrays. A purpose for rotating which spray units are enabled may be to extend the operating life of an entire array by reducing the duty cycle for each spray unit. Visual observation through a window of enclosure 66 may aid in determining satisfactory operation of each spray unit 59.

Purifier 63, such as an RO filtration component, may be within the same enclosure 66 as spray units 59 and drain 73, in that, for instance, seal failure may result in leaked water being directed to drain 73.

A power supply and logic board of controller 60 may power multiple spray units 59 individually, or in groups, to provide desired functions of spray units 59.

Air temperature and humidity may be measured in a plenum just downstream of an associated furnace and AC unit for diagnosis so as to provide proper sizing and health of the furnace and AC unit, for example, to avoid too low temperature of heated air or too high temperature of cooled air.

Humidifying system 55 may be connected such that operation and sensor status may be conveyed to an outside computing device. System 55 may be connected such that a computing device on-board, such as controller 60, can be remotely controlled by another computing device, by recalling in a resident memory of any type.

System 55 may be connected to the internet to gather data, alert an owner about maintenance or an HVAC system issue, or other item of concern or interest, particularly relative to system 55.

Spray units 59 of system 55 may be arranged in various configurations other than that revealed in FIG. 1. FIGS. 2*a*-2*d* are diagrams of spray units 59 in various circular fashions. Spray units 59 may be arranged in a square, triangular, oval, rectangular, and other geometrical forms. Spray units 59 may be oriented to emit droplets up, down, sideways, and at various other angles, or in a combination of different directions. The geometrical forms for placing spray units 59 may be two-dimensional or three dimensional. Spray units 59 may be arranged in a three-dimensional manner which may provide certain desired effects of a respective spray unit arrangement. FIG. 2*a* is a diagram of a round plate layout 75 of spray units 59 on a manifold-like interface 76 with a tube or conveyance mechanism 77 for providing fluid to spray units 59. FIG. 2*b* is a diagram of a thick plate layout 81 with spray units 59 on the plate surface and spray units on the surface of a thick edge of the plate. A center of the plate and its spray units might be absent leaving a ring-like structure having just the thick edge with spray units 59. Such configuration may be referred to a dog-collar.

FIG. 2*c* is a diagram of a drum layout 82 having multiple rows of spray units 59 on the side surface of the drum. The bottom or the top surface may have spray units 59. FIG. 2*d* is a diagram of a layout 83 like that of layout 75 of FIG. 2*a*, but being oriented with spray units 59 at an angle, either up or down, or other ways.

Spray units 59 may be selected from a variety of devices such as nozzle injectors, atomizers, nebulizers, and so forth. For illustrative purposes, example nebulizers may be noted. FIG. 3 is a diagram of nebulizer 85. Nebulizer 85 may be a stainless steel plate 86 having about 600 to 800 holes 87. Each hole 87 may have a diameter of five to seven microns. Other variations of nebulizer 85 may have 50 to 5000 holes in plate 86, having a diameter between 0.5 and 50 microns. A piezoelectric ring 88 may be attached to steel plate 86 encircling holes 87 in plate 86. Plate 86 may be made from other materials. Piezoelectric ring 88 may actuate plate 86 with an AC current applied to leads 93 and 94. Other kinds of mechanisms may be used to actuate plate 86. A shape of the nebulizer 85 layout of holes 87 and piezoelectric ring 88, may each have a shape other than shown in the diagram of FIG. 3. About twenty nebulizers 85 as described in FIG. 3 used as spray units 59 in system 55 may use, as an estimate, about twelve gallons of purified water per day. An amount of water used may vary, particularly in accordance with a design for system 55, associated HVAC, and nebulizers 85.

Plate 86 may have a thickness of about 0.5 mm. Holes 87 may be made within a circle of about 6.5 mm in diameter. Ring 88 of piezoelectric material may be glued to a surface of plate 86 so that holes 87 are within an inner diameter of ring 88. As an AC current or voltage is applied to ring 88, the piezoelectric material of ring 88 may shrink and expand radially. The shrinking may make metal plate 86 buckle and thus eject droplets of fluid (e.g., water).

Nebulizers 85 may be operated with plates 86 in resonance in order to increase movement of plates 86, output and efficiency of the nebulizers. A steady flow of fluid, e.g., water, may be used. During a prolonged use of nebulizers 85, for instance, in a humidifier, there may be a decrease in fluid flow due to a change of resonant frequency of nebulizers 85, for example, due to a load or stiffness change of vibrating plates 86, such as some material being deposited or removed from plates 86 or holes 87. Deposited materials may consist of minerals or other materials or particles, including organics, that are in the water. If each plate 86 is coated with a special film, e.g., hydrophobic or hydrophilic, the material deposited on plate 86, material on plate 86 may be washed out during operation of respective nebulizer 85.

More than one nebulizer may be on a plate.

FIG. 4*a* and FIG. 4*b* are diagrams 91 and 92, respectively, that appear to show an impact of washing nebulizers 85 in soapy water on the resonant frequency of a plate 86. A nebulizer resonant frequency in diagram 92 may indicate a shift in resonant frequency from an original 100 kHz to about 104 kHz. The shift may be attributed to an ultrasound washing with soapy water that removed some mass from plate 86 and increased the resonant frequency. An opposite frequency shift may be caused by a material deposition during operation of nebulizers 85 as spray units 59 during operation in a humidifier system 55 having a purifier 63 that uses an RO filter which cleans out, perhaps, just 95 percent of the minerals of the water conveyed by nebulizers 85. Diagram 91 is a graph of plots of frequency of plate 85 in kHz relative to drive current in milliamps. Curves #1 through #6 are plotted in diagram 91 and are listed in diagram 92 indicating the various nebulizer flows for 100 kHz and 104 kHz, respectively, as indicated by the legend in FIG. 4*a*. From the plot in FIG. 4*a*, of current versus frequency, it may be noted that the resonant frequency shifted to 104 kHz. From the table in FIG. 4*b*, it may be noted that a flow of a nebulizer appears to increase by a factor of two to three once the frequency increased from the original frequency of 100 kHz to 104 kHz.

FIG. 5 is a diagram of a drive circuit 95, which may be modified to adjust the frequency to a maximum current consumption, and may be an optimization of current for a nebulizer or a 30 group of nebulizers. Drive circuit 95 may maximize flow by maximizing current. So the nebulizer may be actuated to operate close to or at the resonant frequency. Frequency tuning may be achieved by measuring current magnitude at lead 93 or 94 of piezoelectric ring or element 88, that makes the mesh plate vibrate. The current may be the largest in magnitude during resonance since most of the water is pushed out by plate 86 as it moves by the largest amount. Pushing out more water may require more energy than is provided by the electric current. Therefore, frequency optimization may be achieved by changing the frequency of the drive current to piezoelectric element 88 reaches a maximum amount of drive current. Current measurements and frequency adjustments may be done for an individual device or for groups of devices to avoid costs of additional electrical components. The approach for a group of nebulizers is feasible if all nebulizers in the group have the same mass addition or removal.

FIG. 5 is a diagram of a driver circuit 96, which may be a part of controller 60 in FIG. 1. A microcontroller 140 may provide a signal to a waveform generator 141, which may output an AC signal having a frequency that is adjustable according to a signal from microcontroller 140. The AC signal may go to a driver 142. Driver 142 may provide the signal from generator 141 with sufficient current to drive piezoelectric ring 88 (FIG. 3). Measuring circuit 143 can provide a current magnitude measurement to microcontroller 140, which may vary the signal to waveform generator 141 that adjusts the frequency so that the current magnitude achieves a maximum. Current from driver 142 may go to a nebulizer 85 or an array of nebulizers 85 via leads 93 and 94 to piezoelectric ring 88 of the one or more nebulizers 85. Microcontroller 140, waveform generator 141, driver 142 and current measuring circuit 143 may constitute a servo loop of circuit 96 for self-calibration and maximizing the current of the drive signals for maximizing flow by nebulizer or nebulizers 85. Circuit 96 may ensure automatic adjustment of the nebulizer drive frequency to be at resonance in spite of drift of the resonant frequency of nebulizer 85 over time.

Relative to nebulizers 85 that may be used as spray units 59, some issues might appear apparent. Running nebulizers dry in periods of long activity to prevent an appearance of pathogens in standing water, a dry state may be detected by observing a higher current in each nebulizer. Nebulizers should not be left to run dry for long periods of time.

Determining leakage in system 55 may be done by measuring a water flow rate that exceeds the nebulizer flow rate. Each nebulizer 85 flow may be characterized periodically so that a correct amount of water is delivered to air to avoid condensation.

A design of a nebulizer and a wing to provide or improve a laminar air flow may be one way to optimize droplet mixing with air and ensuing evaporation. For instance, a humidifier that injects small water droplets in an air stream or flow may cause droplet accumulation on nearby surfaces if the air flow is turbulent. Accumulated water may drip down and form a puddle that can cause water damage and encourage a growth of algae, bacteria or mold. An example of such a humidifier may be a nozzle injection system or a nebulizer system.

The water issue may be solved by creating very small and uniform droplets 68 (FIG. 1), thus minimizing large droplet formation and entraining the droplets in a laminar versus a turbulent air flow. Nebulizer plates 86 may be a way of generating small droplets 68. The nozzle or hole 87 size in plates 86 should be very uniform because even a few micro holes with a larger diameter than holes 87 may result in a big quantity of large droplets. The large droplets may also form from collisions between small droplets. Large droplets may take a long time to evaporate and during that time can hit and accumulate on return air duct structure 72 (FIG. 1). Thus, the droplets should be very small, e.g., 5-7 microns, so as to evaporate before they have many chances of collision or create a deposition of water on air duct 72 features like corners or walls. The large droplets that follow a straight path due to their larger momentum may be hit by small droplets that follow a slightly turbulent direction. This activity may generate even larger droplets. However, the small droplets may be injected in a laminar air flow so that they follow parallel paths and have a lower probability of colliding and creating large droplets. Laminar air flow may be obtained with a special shape of a nebulizer head 151 as shown in diagrams of FIG. 6*a* and FIG. 6*b*. For instance, the nebulizer head 151 may have a shape of a rectangular wing that is attached in the middle of an air duct 152. Arrays 153 of nebulizers may be situated at a leading edge of head 151 on the bottom and top of head 151. Electronics, a valve and filter e.g., RO, may be in a box 154 with a water line 155 and electrical drive 156 connected to nebulizer arrays 153. The diagram of FIG. 6*a* shows a side view of wing shaped nebulizer head 151, and the diagram of FIG. 6*b* shows a bottom view of the wing shaped nebulizer head 151. A level sensor 164 may be placed at nebulizer head 151.

An edge of an opening holding nebulizer array 153, or plate 86 (FIG. 3) on nebulizer head 151 may cause turbulence that could be removed with a water proof gasket 162 by attaching nebulizer array 153 with double-sided sticky tape 161 or gluing array 153 to an outside wall of nozzle head 151 shown in a diagram of FIG. 7. Such configuration may remove surface features that produce air flow eddies, and provide for an entrainment of droplets in the air flow or stream without collisions. The nozzles may also be placed on a top surface of nebulizer head 151 as in a diagram of FIG. 8, and water may be delivered to the nozzles by filling a container or providing a wick.

Nebulizer head 151 may be manufactured with 3D printing. Double sticky tape 161 with a thin layer of foam may be recommended to allow for vibration of nebulizer array 153 plate 86, as it may be a vibration force that ejects droplets 68 (FIG. 1). The rest of a system may consist of a water purifier, e.g., reverse osmosis, a nebulizer drive and controller that turns the nozzle plates 86 on and off, and maintains a water level in head 151.

A nebulizer may be damaged if it operates without water. On the other hand, leakage may develop if the water level for the nebulizer gets too high. The water level may be sensed by a level detector, e.g., a conductivity based detector.

The present system may incorporate an enclosure and a humidifier that can easily replace an already installed humidifier in many homes and buildings. The humidifiers and respective enclosures may be noted herein. FIG. 9 is a diagram of enclosure 11 for a humidifier arrangement that incorporates an emitter or nebulizer array 12 that provides droplets 13 of water into an air 14 that flows sideways from duct 15 through a volume 16 where the air 14 interacts with droplets 13 to become misty air 17 that flows down toward the bottom of enclosure 11 and out of the enclosure through a cold air return duct 18. The term "down" may mean toward the earth's surface. The term "up" may mean away from the surface of the earth. A clear window 19 may be part of enclosure 11 that might permit one to see the misty air 17 flowing through enclosure 11. A drain may be at the bottom of enclosure 11 for removal of water from the enclosure. Items 21 may be magnetic plugs that aid in connecting enclosure 11 to ducts 15 and 18. FIG. 10 is a diagram that reveals a top view 22, a front view 23 and a right or side view 24 of enclosure 11. Enclosure 11 may be regarded as a pill type enclosure.

FIG. 11 is a diagram of an enclosure 25 for a humidifier arrangement that incorporates an emitter nebulizer array 26 that provide droplets 27 of water downward into an upward flow of air 28 from a duct 31 to a center portion of enclosure 25 and become an air and mist mixture or misty air 29 that moves downward toward a bottom of enclosure 25 into a cold air return duct 32. FIG. 12 is a diagram that reveals a front view 33, a bottom view 34 and a side or right view 35 of enclosure 25. Enclosure 25 may be oriented in different positions where the droplets 26 are emitted sideways and that the mist and air 29 move sideways into duct 32. Enclosure 25 may be regarded as a round type enclosure.

FIG. 13 is a diagram of an enclosure 38 for a humidifier arrangement that incorporates an emitter or nebulizer array 39 that provides droplets 41 of water upward into an incoming air flow 42 from an entrance or duct 43. Droplets 41 may move upward from array 39 along with air 42 and mix into a mist and air 43 to move upward in a center tube 44 and then downward in an outer concentric tube 45 and then upward at an inside volume of wall 47 of enclosure 38 to a cold air return duct 48. FIG. 14 is a diagram that reveals a top view 51, a front view 52, and a side or right view 53 of enclosure 38. Enclosure 38 may be regarded as a cyclone type of enclosure.

FIG. 15 is a diagram of a model "A" humidifier enclosure 245. Enclosure 245 may have a lower housing 246 and an upper housing 247. There may be an existing bracket 248 for attachment of the lower and upper housings. There may be an air intake port 249 and an emitter housing 251. Also shown are a test button 252 and a plastic tinted front shell 253.

FIG. 16 is a diagram of enclosure 245 without front shell 252 thereby revealing some internal components in enclosure 245. Emitter housing 251 may contain an emitter arrangement and an LED. An air guide 254 and an air output port 255 are shown.

FIG. 17 is a diagram revealing an air flow 257 through enclosure 245. Dry air may enter air intake port 249, go past the emitter in housing 251 where micro water droplets 258 are released by the emitter into the dry air of air flow 257 where the air becomes humid and flows through lower housing 246, around air guide 254 into upper housing 247, and through output port 255 as humid air. Air flow 257 may follow a path that is of an extended nature for a given size of enclosure 245 to ensure evaporation of droplets 258 before reaching output port 255.

FIG. 18 is a diagram of a back view of enclosure 245. Air intake port 249 may have a pipe placement or attachment component. Enclosure 245 may be attached to the existing bracket 248 with output 255 for humidified air moving into a return air duct. Pegs 261 may secure enclosure 245 to existing bracket 248.

FIG. 19 is a diagram showing emitter housing 251 with emitters 262 and one or more LEDs 263. Housing 251 may fit into a cavity 264 of enclosure 245. Emitters 262 may eject micro droplets 258 into dry air coming through air intake port 249.

To reiterate, the approach may incorporate determining a temperature in a space associated with a humidifying unit, determining a relative humidity in the space, determining an air speed associated with the humidifying unit, and adjusting an amount of water sprayed by the humidifying unit based, at least in part, on the temperature, the relative humidity, and the air speed.

A humidifying device may be modular and scaled for use in small spaces (e.g., vehicles, residences, or the like) and/or large spaces (e.g., large residences, commercial buildings, and the like) as well as spaces in between. Humidifying devices in accordance with the present disclosure may be used in spaces designated for specialized commercial operations, such as internet server centers and/or clean rooms (e.g., spaces for integrated circuit fabrication).

Items of the present disclosure may be modular, such as those that are easier to control, more efficient, and/or more reliable than previous approaches.

Various approaches may incorporate spray units (e.g., spray heads) in an array, for instance (e.g., as part of a super-humidifying device or unit (hereinafter referred to as a "humidifier")). Each spray unit of the array may be controlled and/or operated (e.g., turned on and/or off) independently. Independent operation may be performed using a respective control component (e.g., an actuator and/or electric switch) associated with each spray unit.

By operating the spray units independently of each other, one may allow each spray unit to be used for a reduced period of time and/or at intervals with respect to previous approaches. Independent operation may increase a lifetime of each individual spray unit, for instance, as well as a humidifier incorporating the array of spray heads.

The presence of spraying units in the humidifier may allow for a gradual degradation of humidifier performance rather than abrupt degradation and/or failure as with previous approaches. For example, a humidifier having twelve spray heads where one has failed may be just minimally reduced in performance versus a humidifier having a single spray head that fails. Thus, a useful life of the humidifier may be extended in instances where some of the spray heads experience failure(s).

Further, independent operation of spray units may allow for rotation of active spray units. That is, some embodiments may allow cycling of activated (e.g., turned-on and/or spraying) spray units. For example, a first subset of the array of spray units (e.g., a first nozzle plate) may be operated for a period of time (e.g., 1-2 minutes) and then a second subset of the array of spray units (e.g., a second nozzle plate) may be operated for another period of time (e.g., 1-2 minutes) while the first subset is deactivated. Thereafter, the first subset may be reactivated and/or a third subset (or more subsets) may be activated similarly. Using independent operational control of the spray units may also allow the activation and deactivation of spray units within a single nozzle plate.

Condensation problems associated with some approaches may be reduced (e.g., eliminated) because by rotating activated spray units, the present approach may avoid cooling portions of a humidifier (e.g., nozzle plate fixtures) to a degree such that water vapor condenses thereon. By reducing condensation, the present approach may increase efficiency associated with operation of a humidifier and reduce (e.g., eliminate) contamination of air ducts with water, for instance. Durations of activity and/or inactivity of spray units may be determined based on one or more factors. For instance, rotation frequency may be increased based on increased level(s) of humidity.

Rotation frequency may be decreased based on decreased fan speed(s) and/or temperature(s).

In an example, rotation may incorporate a first subset of plurality of spray units being activated for a particular period of time. Then, the rotation may incorporate a second subset of the plurality of spray units being activated and the first subset of the plurality of spray units being deactivated for the particular period of time. The subsets may be determined based on their location. For example, the firsts subset may be located on a first side of the humidifier and the second subset may be located on a second (e.g., opposing) side of the humidifier. Reducing condensation by rotating spray units may reduce humidifier deterioration caused by prolonged presence of moisture (e.g., on dry side of humidifier), for instance.

Application of coatings with super-hydrophobic properties to specific surfaces or the entire surface of the present system may also provide a way to mitigate the condensation, or accumulation of water by preventing it from accumulating at all. By way of example, and not limitation, Super-hydrophobic coatings may be applied to surfaces within the system which have a high likelihood of accumulating water droplets, or are susceptible to problems such as growth of biological contaminants, accumulation of water-borne materials, corrosion, rot, discoloration or pooling.

Modular designs in accordance with the present system are not necessarily limited to a particular configuration. Rather, such designs may be customized according to duct access, orientation (e.g., vertical or horizontal) and/or size. By way of example, and not of limitation, the present approach and system may incorporate vertical configurations of one or more arrays of spray units and/or horizontal configurations of one or more arrays of spray units (e.g., using narrow trays and a nozzle plate or plates inserted in a middle of a duct).

In addition to modularity, the present approach and system may provide humidification in conjunction with cooling more efficiently than some other approaches. For example, in previous approaches, standard cooling heat exchange coils may extract humidity from air due to condensation on cold surfaces. Because the condensation may release heat, air conditioning units might need to compensate and thus consume more electricity.

Further, once some approaches have removed humidity from the air, an additional humidifying device (e.g., an evaporator) may be employed to replenish it. However, such devices may generate heat and thus utilize more electricity. In some other approaches, energy may be expended twice— first to condensate water from vapor, and then to evaporate water.

The present system may reduce electricity usage by providing humidification and cooling in a single device. For example, the system may allow a regulation of water dispersed (e.g., sprayed) by a humidifier such that the water (e.g., virtually all the water) evaporates rather than condenses on surfaces of ducts. Such system may be based on a principle that the evaporation speed of a water droplet is proportional to the diameter of the droplet squared and inversely proportional to a difference between the dry and wet bulb temperatures.

Further, a time of flight of a droplet before it reaches a surface on which it may be deposited may also be inversely proportional to the speed of the air carrying it. That speed, for instance, may be controlled and/or determined by the speed (e.g., setting) of a fan in forced air conditioning systems. Accordingly, embodiments of the present system may finely control an amount of water used by a humidifier to achieve desired cooling and/or humidification while reducing condensation based, at least in part, on air temperature, humidity, and air speed.

It may be noted that "a number of spray units" may refer to one or more spray units.

An array of nebulizers may be configured to expel air to prevent the degradation of array performance from trapped air. Through the normal operation of a nebulizer, the expulsion of water droplets also has the possibility of ingesting air bubbles, which can accumulate near or against the water source facing surface of the nebulizer, causing an interruption in normal operation. By shaping the nebulizer array such that air bubbles are drawn away from the operating nebulizers, and accumulated then expelled by the array, the array can continue to operate normally.

The system may use one or more mechanisms to regulate water pressure within the system to prevent over-pressurization which can lead to nebulizers "sweating" when not operating. By way of example, and not limitation, a reservoir may be used within the system to hold water at a depth which cannot exceed that which causes water pressure to exceed the maximum supported by the nebulizer.

The system may incorporate several visual elements to give human operators feedback as to the operational health of the system. By way of example, and not limitation, the System may incorporate LED illumination to make the mist more visible to an observer, and also incorporate transparent viewing elements into the design to further enable the observation of water mist.

The system may incorporate a user input button which can allow the unit to begin operating regardless of the normal operating stats it is in. This function is designed to show an operator that the unit is functioning properly, even if the related systems that control it (i.e.: the furnace and/or humidistat) are not presently telling the unit to operate. For example, and not limitation, activating the feature may cause the unit to begin operating, as if under normal operating conditions to allow for the creation of water mist by the nebulizer array, and illumination to be turned on, so that an observer can see that plumbing has been installed properly, and the system has power needed to function.

Figure 20:
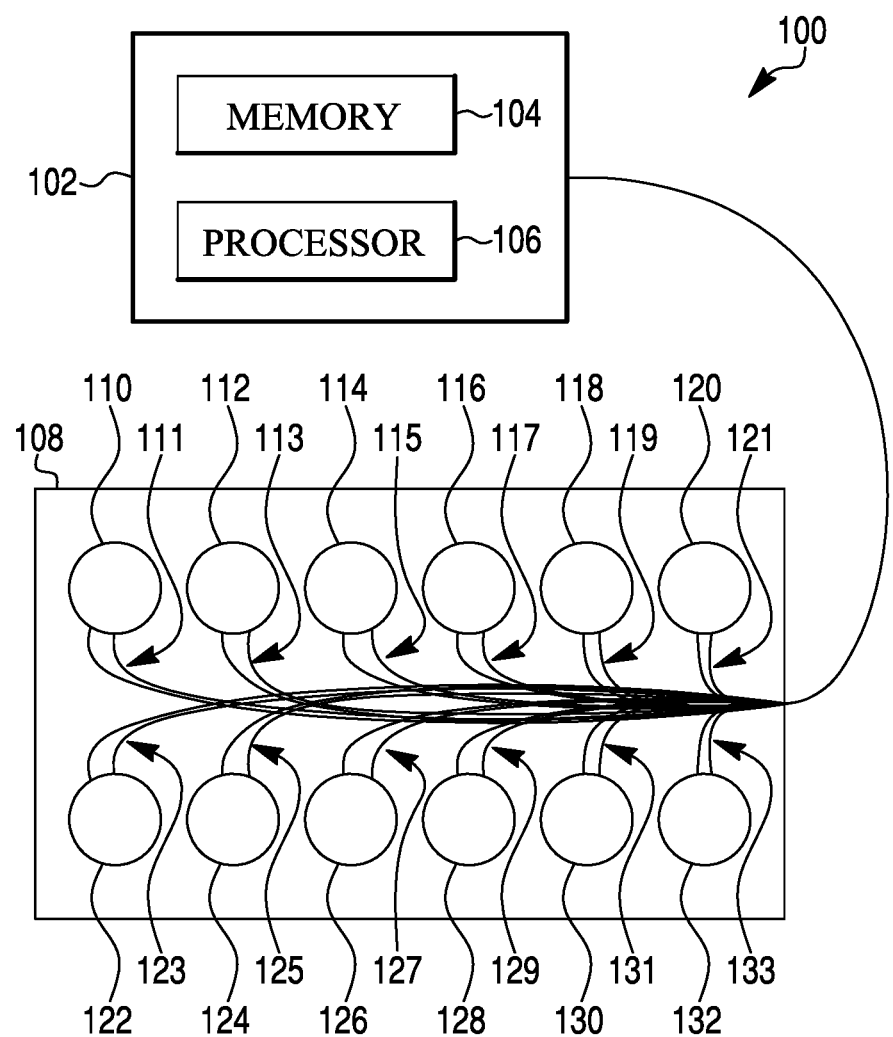

FIG. 20 is a diagram of a system 100 for humidifying. System 100 may incorporate a control unit 102 communicatively coupled to a humidifying unit 108. Control unit 102 may, for example, be a computing device having a memory 104 (e.g., storing a set of executable instructions) and a processor 106 (e.g., configured to execute the executable instructions), though various versions of the present system are not necessarily limited. For example, control unit 102 may incorporate an integrated circuit and/or logic to perform a number of the functionalities described herein.

Control unit 102 may incorporate a memory 104 and a processor 106. Memory 104 may be any type of storage medium that can be accessed by processor 106 to perform various examples of the present disclosure. For example, memory 104 may be a non-transitory computer readable medium having computer readable instructions (e.g., computer program instructions) stored thereon that are executable by processor 106 for humidifying in accordance with one or more embodiments of the present disclosure.

Memory 104 may be volatile or nonvolatile memory. Memory 104 may also be removable (e.g., portable) memory, or non-removable (e.g., internal) memory. For example, memory 104 may be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 104 may be illustrated as being located in control unit 102, embodiments of the present disclosure are not necessarily so limited. For example, memory 104 may also be located internal to another computing resource (e.g., enabling computer readable instructions to be downloaded over the Internet or another wired or wireless connection).

Humidifying unit 108 may incorporate a plurality (e.g., array) of spray units. As shown in FIG. 20 humidifying unit 108 may incorporate a spray unit 110, a spray unit 112, a spray unit 114, a spray unit 116, a spray unit 118, a spray unit 120, a spray unit 122, a spray unit 124, a spray unit 126, a spray unit 128, a spray unit 130, and a spray unit 132 (sometimes generally herein referred to as "spray units 110-132"). Although 12 spray units may be illustrated in the example shown in FIG. 20, embodiments of the present disclosure are not necessarily limited to a particular number of spray units.

As shown in FIG. 20, each of spray units 110-132 may be connected (e.g., communicatively coupled) to control unit 102 by a respective pair of wires. Spray unit 110 may be connected via wires 111, spray unit 112 may be connected via wires 113, spray unit 114 may be connected via wires 115, spray unit 116 may be connected via wires 117, spray unit 118 may be connected via wires 119, spray unit 120 may be connected via wires 121, spray unit 122 may be connected via wires 123, spray unit 124 may be connected via wires 125, spray unit 126 may be connected via wires 127, spray unit 128 may be connected via wires 129, spray unit 130 may be connected via wires 131, and spray unit 132 may be connected via wires 133 (the wires illustrated in FIG. 20 may sometimes be cumulatively referred to herein as "wires 111-133").

Accordingly, control unit 102 may communicate with and/or control an operation of (e.g., activate and/or deactivate) each of spray units 110-132 independently (e.g., individually). Each of spray units 110-132 may incorporate a spray nozzle. For example, each of spray units 110-132 may incorporate an ultrasonic atomizer and/or nebulizer having a piezoelectric element (e.g., ceramic, crystal, and so forth) attached to a metal plate with an array of small openings (e.g., holes), for instance (e.g., 5 microns in diameter). In an ultrasonic atomizer, voltage applied across the piezoelectric element (e.g., via any of the wires 111-133) may cause the element to vibrate and expel water droplets through the openings (e.g., a fine mist of water). The present system is not necessarily limited to a particular type of spray unit and may incorporate various devices configured to disperse water (e.g., fine water droplets) into air.

Being modular, the system illustrated in FIG. 20 may allow for the minimization of condensation upon any portion of humidifying unit 108. Because condensation may release heat, air conditioning units may use increased energy to maintain cool temperature levels in some other approaches. The present system may regulate a length of activation time and/or an amount of water sprayed by one or more spray units of a humidifying unit such that the sprayed water is evaporated rather than condensed. Reducing condensation may incorporate, for instance, rotating one or more spray units.

Figure 21:
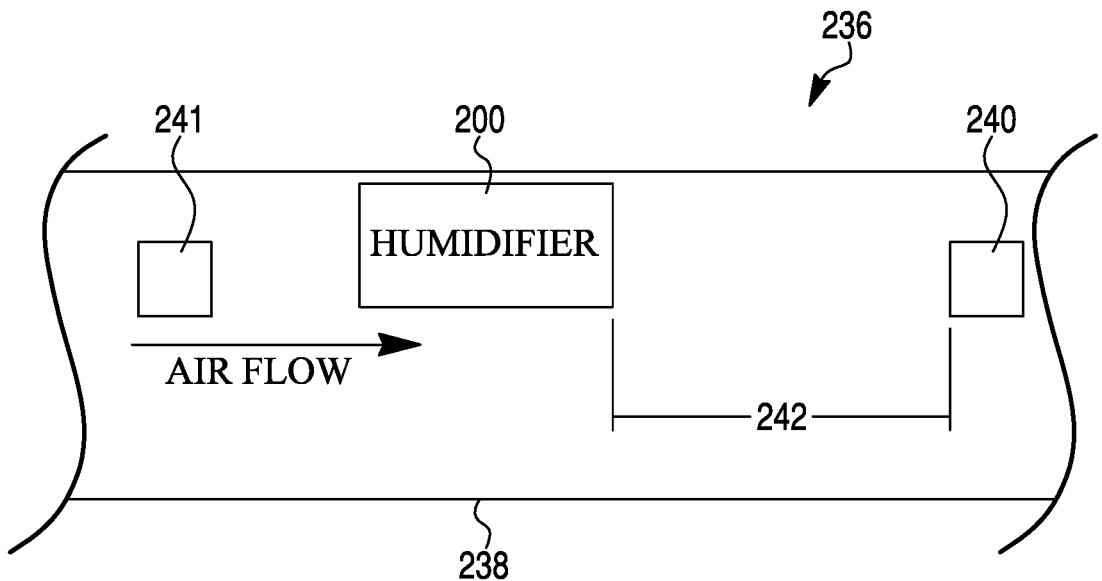

FIG. 21 is a diagram of a system 236 for humidifying. System 236 may, for example, combine a cooling system (e.g., an air conditioner) with a humidification system (e.g., a humidifier). System 236 may make use of a principle that a rate of water droplet evaporation is proportional to a diameter of the water droplet squared and inversely proportional to a difference between a dry bulb temperature and a wet bulb temperature. Another principle used may be that a time of flight (e.g., through a duct) of water droplets before they reach a surface on which they may be deposited is inversely proportional to a velocity of the air (e.g., the fan speed setting in a forced air conditioning system). Accordingly, in such a system, depending on a temperature of the air, a humidity, and a speed of the fan, a target (e.g., desired) cooling and/or humidification rate, may be controlled by varying an amount of water released by the humidifier.

Additionally, or alternatively, a target cooling and/or humidification rate may be controlled by varying an air speed passing (e.g., passing by, over, under, across, and so on) a humidifier. The air speed may be proportional and/or related to a speed (e.g., speed setting) of a fan of an HVAC system associated with the space.

System 236 may incorporate a humidifier 200 (e.g., a humidifier analogous to system 100 (FIG. 20) and a sensor unit 240 inside an air duct 238 (illustrated as a cross-section of a portion of a duct in FIG. 21). Sensor unit 240 may be located a particular distance 242, in a direction of air flowing through the duct, from humidifier 200.

Though not necessarily shown, system 236 may incorporate a fan. The fan may be in communication with a control unit (e.g., control unit 102 of FIG. 20) through a wired and/or wireless connection. The fan may have a fixed speed, or the fan may have a number of discrete speed settings. Or fan speed may be continuously adjustable over a range of speeds. There may be an adjusting a speed of a fan (e.g., to provide desire cooling and/or air flow).

Sensor unit 240 may incorporate a number of sensors. Although sensor unit 240 is illustrated as a single component, various adaptations sensor unit 240 may be in accordance with the present system. For example, sensor unit 240 may incorporate one or more temperature sensors. Temperature sensors may be configured to determine (detect, measure, and/or acquire) dry bulb temperature(s) inside duct 238.

Additionally, sensor unit 240 may incorporate one or more relative humidity sensors. For example, the wet bulb temperature may be inferred from humidity and temperature measurements using a known relationship (e.g., dependence), which may be represented in a table and/or equation, for instance. Such examples are not necessarily to be taken in a limiting sense; rather, sensor unit 240 may incorporate any number and/or type of sensor configured to determine various parameters associated with the air flowing through duct 238.

System 236 may incorporate an upstream sensor unit 241. Upstream sensor unit 214 may incorporate one or more temperature sensors and/or relative humidity sensors in a manner analogous to sensor unit 240, for instance. Upstream sensor unit 241 may be in communication with a control unit (e.g., control unit 102, noted in connection with FIG. 20) through a wired and/or wireless connection, for instance.

Upstream sensor unit 241 may be used in conjunction with sensor unit 240 to determine change(s) in temperature and/or humidity caused by humidifier 200. Locating upstream sensor 241 immediately upstream from humidifier 200 may allow embodiments of the present disclosure to moderate and/or finely tune one or more operations of humidifier 200.

As air flows through duct 238, humidifier 200 may disperse water droplets which can be carried through the air along distance 242. Distance 242 may be determined and/or selected such that the water droplets released from humidifier 200 have sufficient time to evaporate (e.g., sufficient time for humidity mixing in the air) before reaching sensor unit 240, for instance. Measurements associated with the flowing (e.g., flowing and humidified) air may be taken by sensor unit 240 and used by embodiments of the present disclosure to vary an amount of water released by humidifier 200, for instance, in controlling and/or maintaining a target cooling and/or humidification rate.

The present system may incorporate maintaining relative humidity within a particular humidity range. That is, it may maintain relative humidity below a first threshold and above a second threshold. A control unit may be configured to receive an indication of the relative humidity and an indication of the temperature and cause a modification of an operation of the humidifying unit in response to at least one of the relative humidity and the temperature exceeding a particular threshold.

For example, a temperature difference between dry bulb temperature and wet bulb temperature may be kept below 5 degrees Celsius (Tdrybulb−Twetbulb=5 C). Additionally, the temperature at sensor unit 240 may be maintained above a particular threshold (e.g., greater than 15 degrees Celsius). Humidity may be controlled by keeping relative humidity on a curve corresponding to the difference between dry bulb temperature and wet bulb temperature. In the example where such a difference may be 5 degrees Celsius, the curve may be represented by:

$$0.0216 * T^2 + 1.8944 * T + 30.656.$$

The curve may be derived from various properties of humid air by maintaining the difference between the dry bulb temperature and wet bulb temperature at 5 degrees Celsius, for instance. It may be to be understood that a different curve would correspond to a different temperature difference (e.g., a different curve would result from a difference between the dry bulb temperature and wet bulb temperature being 7 degrees Celsius) as well as other factors.

For increased temperature differences (e.g., 7 degrees Celsius), higher air speed and/or smaller duct size or sizes may be used. Increased temperature differences may be used in the system having larger droplets (e.g., if droplet diameter increases by a factor of 1.41, temperature difference may increase two-fold).

Droplet size may be kept constant by maintaining parameters of spray units (e.g., nozzles). For example, droplet size may be kept constant by keeping the spray unit frequency and/or actuation voltage under a threshold at which the droplets may tend to merge into a continuous stream of water.

To control humidity, the present system may adjust a number of spray units that are activated and/or deactivated. The activation and/or deactivation may be responsive to a temperature exceeding a particular threshold. For example, a threshold temperature may be established (e.g., 16 degrees Celsius and/or 8 degrees Celsius below a set point of a thermostat associated with humidifier 200). Then, if a temperature determined by sensor unit 240 increases above the threshold temperature and a relative humidity determined by sensor unit 240 decreases below the curve, a spray unit (e.g., spray unit 122) may be activated.

If the thermostat is not requiring cooling, the threshold temperature may be higher (e.g., 20 degrees Celsius and/or 2 degrees Celsius below the thermostat set point), so the cooling may not be as pronounced as previously discussed, but humidification may still be occurring. Thus, for various temperatures and velocities of incoming air, the present system may reduce (e.g., prevent) condensation by ensuring that water droplets are evaporated (rather than condensed).

The present system may deactivate humidifier 200 if relative humidity is determined by sensor unit 240 to exceed a particular threshold (e.g., 35%). In such instances, air conditioning (e.g., traditional air conditioning), rather than humidification, may be used to provide cooling. The present system may accordingly cause a modification of an operation of the humidifying unit in response to the relative humidity exceeding a particular threshold and/or the temperature exceeding a particular threshold.

Figure 22:
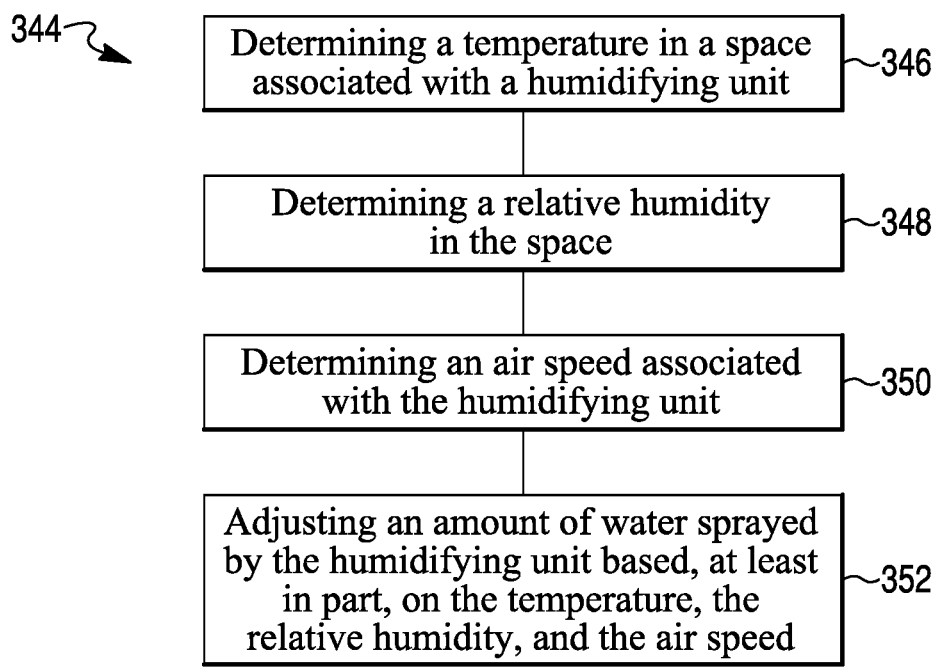

FIG. 22 is a diagram of an approach 344 for humidifying in accordance with the present system. Approach 344 may be performed by a control unit (e.g., control unit 102 (FIG. 20), for instance. The control unit may, for example, be a computing device, but not necessarily so limited. For example, the control unit may incorporate an integrated circuit and/or logic.

At block 346, approach 344 may incorporate determining a temperature in a space associated with a humidifying unit. In some versions, a temperature may be determined in a duct associated with a humidifying unit. That is, approach 344 may incorporate determining a temperature in a duct at a particular distance downstream from the humidifying unit. In other versions, a temperature may be determined at other locations. For example, a space associated with a humidifying unit may contain a thermostat. The thermostat may determine a temperature at its location in the space, for example. The thermostat may be in communication with the control unit through a wired and/or wireless connection, for instance. However, a temperature may be determined at additional or other locations within the space.

At block 348, approach 344 may incorporate determining a relative humidity in the space. In some versions, a relative humidity may be determined in a duct associated with a humidifying unit. That is, approach 344 may incorporate determining a downstream relative humidity in a duct at the particular distance downstream from the humidifying unit.

In other versions, a relative humidity may be determined at other locations. For example, a space associated with a humidifying unit may contain a thermostat. The thermostat may determine a relative humidity at its location in the space, for example. The thermostat may be in communication with the control unit through a wired and/or wireless connection, for instance. A relative humidity may be determined at additional or other locations within the space.

At block 350, approach 344 incorporate determining an air speed associated with the humidifying unit. An air speed may be a speed of air passing (e.g., passing by, over, under, across, or otherwise) the humidifying unit. The air speed may be proportional and/or related to a speed (e.g., speed setting) of a fan of an HVAC system associated with the space. In some versions of the present system, determining the air speed may incorporate determining the fan speed. A relationship between fan speed and air speed may allow the determination of air speed based on fan speed. It may be understood that such a relationship may vary depending on the particular installation and may be determined (e.g., calibrated), for instance, at the time of installation.

Accordingly, the fan may be in communication with the control unit through a wired and/or wireless connection. In some versions, a fan may have a fixed speed. In other versions, a fan may have a number of discrete speed settings. Or a fan speed may be continuously adjustable over a range of speeds. Further yet, a fan (e.g., a fan speed) associated with the humidifying unit may be adjusted (e.g., to provide desired cooling, humidity, and/or air flow).

At block 352, approach 344 may incorporate adjusting an amount of water sprayed by the humidifying unit based on the temperature, the relative humidity, and the air speed. Adjusting an amount of water sprayed by the humidifying unit may incorporate activating and/or deactivating a portion of the humidifying unit (e.g., a number of spray units of the humidifying unit).

Adjusting may incorporate cycling of activated (e.g., turned-on and/or spraying) spray units. Individual spray units may be controlled independently. The amount of water sprayed may be adjusted based on a desired humidity level in the space associated with the humidifying unit.

Approach 344 may incorporate determining an upstream relative humidity in a duct upstream from the humidifying unit. The upstream relative humidity may be determined using an upstream sensor unit (e.g., upstream sensor unit 214), which may incorporate one or more temperature sensors and/or relative humidity sensors. Determining the upstream relative humidity may allow the determination of change(s) in temperature and/or humidity caused by the humidifier and/or the fine tuning of one or more operations of the humidifier.

Additionally, many homes (especially in the southwestern United States, which have warmer climates) have ducted A/C systems. Embodiments of the present disclosure could be used as a humidifier that uses small "atomizer" plates that create droplets of water that are microscopic and uniform.

By tightly controlling the droplet size to something that may be easily absorbed in a room temperature air stream, the system may output a significantly level of moisture without risk of condensation in the ductwork. By spraying fine droplets in the air, the device may output far more moisture than an evaporative pad style device, and without the pressure drop associated with a honeycomb style pad. In this way, it may function as an evaporative cooler while recirculating the indoor air, regardless of the outdoor conditions.

The present system does not necessarily rely on bringing in outdoor air, which may be undesirable for a number of reasons (e.g., high temperature, pollution, allergens). It may be retrofitted to existing ductwork without new ductwork or adding an outdoor unit to the home. It may function together with an air conditioner, instead of working against it.

The present system may operate as an “atomizer” device that could be set up as a “stage” of cooling alongside a current temperature and relative humidity (RH %) to understand how much moisture could be absorbed in the airstream efficiently.

If the RH % is low enough and there may be a need for cooling, the system could operate the humidifier instead of the air conditioner to attempt to meet the homeowner’s set point. If the temperature load became too great, or the RH % rises above the desired level, the unit could be turned off and the traditional A/C could be used instead. The energy savings for doing this could be substantial. Using a Seasonal Energy Efficiency Ratio (SEER) system and $0.14 per kWh as a baseline, delivery of a gallon of water using this system would save $1.14. A gallon of water may be $0.004/gallon (or $0.02 per gallon if one needs to use reverse osmosis (RO) and only get 20% efficiency). So a 12 gallon/day system could save the homeowner over $13 per day in energy costs.

Versions of the present system may be used like a traditional humidifier as well. In winter months when it is dry, the unit may add humidity to the air. This may increase the heating load and cause the furnace to run to reach temperature set points. One advantage of the present system in such a manner may be that it may run both during “heat” cycles, but also just “fan” cycles on the main HVAC unit, since it does not necessarily rely on the furnace heat to evaporate moisture.

To recap, a humidifier system may incorporate an enclosure having an input port and an output port, one or more spray units situated in the enclosure, and a conveyance mechanism having an output connected to the one or more spray units, and having an input for receiving a fluid. The one or more spray units may provide fluid droplets into air flowing through the enclosure.

The enclosure may incorporate one or more channels that effectively extend an evaporation distance due to cyclonic effects from the one or more channels, and consequently increase evaporation of fluid droplets from the spray units in the air flowing from the input port to the output port.

Each spray unit may be a nebulizer. Each nebulizer may incorporate a plate having one or more holes with diameters between one and one hundred microns, and a piezoelectric material attached to the plate. The piezoelectric material may have an opening that encloses the one or more holes of the plate. A nebulizer may share a plate with one or more nebulizers.

The input port of the enclosure may be for receiving a flow of air having a first temperature. The output port of the enclosure may be for providing a flow of air having a second temperature. The first temperature may be higher than the second temperature.

The system may further incorporate a water purifier having an output connected to the input of the conveyance mechanism and having an input for receiving a fluid. The fluid may be water.

The water purifier may clean the water with a reverse osmosis process.

The enclosure may have a drain for removal of condensed fluid in the enclosure.

The piezoelectric material may actuate the plate to vibrate at a frequency according to an AC current applied to the piezoelectric material.

The system may further incorporate a driver that applies the AC current to the piezoelectric material. A self-calibrating circuit of the driver may adjust the frequency of the AC current to a resonant frequency of the plate of the nebulizer.

An approach for humidifying air, may incorporate flowing air through a first port into an enclosure, through the enclosure, and out of the enclosure through a second port of the enclosure, spraying the air flowing through the enclosure with droplets of water from a spray assembly, determining a relative humidity of the air flowing out of the enclosure through the second port of the enclosure, and adjusting an amount of water provided by the spray assembly as droplets of water into the air flowing through the enclosure to achieve the relative humidity at a predetermined percentage of the air flowing out of the second port of the enclosure.

The spray assembly may incorporate one or more spray units, and a manifold having an input connected to a water supply and one or more outputs connected to one or more spray units. Each spray unit may incorporate one or more plates attached to the one or more outputs, respectively, of the manifold. Each of the one or more plates may have one or more holes.

The amount of water provided to the spray assembly may first enter the input of the manifold and go through the one or more outputs of the manifold to the one or more plates and come out from the one or more holes of each plate as droplets of water into the air flowing through the enclosure.

The droplets of water may be sufficiently small enough to form a vapor in the air flowing through the enclosure or flowing out of the enclosure through the second port of the enclosure.

Each of the one or more plates may incorporate a group of 100 to 1000 holes having a diameter between one and 20 microns.

Each of the one or more plates may further incorporate a piezoelectric material on a perimeter on a surface of each plate around the group of holes.

The approach may further incorporate purifying the amount of water provided to the spray assembly.

The one or more plates may be actuated with an AC current applied to the piezoelectric material, to provide the droplets of water.

A humidifier may incorporate an enclosure having an input and an output, one or more emitters situated in the enclosure, a fluid conveyance mechanism connected to the one or more emitters, and a control unit connected to the one or more emitters. The control unit may be configured to activate the one or more emitters. When the one or more emitters are activated, the one or more emitters may be configured to provide droplets of fluid that evaporate within a predetermined distance from the emitters, in the enclosure.

The humidifier may further incorporate a fluid filtration component having an input for connection to fluid supply and having an output connected to the fluid conveyance mechanism.

Air may enter the input of the enclosure, flow through the enclosure, and exit through the output of the enclosure. The droplets of fluid from the one or more emitters may evaporate within the air and due to cyclonic effects on the droplets, the cyclonic effects may reduce the evaporation distance to increase an amount of evaporation of the droplets flowing through one or more channels of the enclosure.

A temperature of the air at the input of the enclosure may be higher than a temperature of the air at the output of the enclosure.

The humidifier may be installed to existing humidifier ductwork by attaching it to a housing of a previously installed humidifier.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A humidifier system comprising:
   an enclosure having an input port and an output port;
   one or more spray units situated in the enclosure, wherein each spray unit comprises:
      a plate having one or more holes; and
      a piezoelectric material attached to the plate, wherein the piezoelectric material has an opening that encloses the one or more holes of the plate; and
   a conveyance mechanism having an output connected to the one or more spray units, and having an input configured to receive a fluid; and
   wherein the one or more spray units are configured to provide fluid droplets into air flowing through the enclosure.

2. The system of claim 1, wherein the enclosure comprises one or more channels that effectively extend an evaporation distance due to cyclonic effects from the one or more channels, and consequently increase evaporation of the fluid droplets from the one or more spray units in the air flowing from the input port to the output port.

3. The system of claim 1, wherein
each spray unit is a nebulizer, and
wherein each of the one or more holes of the plate have a diameter between one and one hundred microns.

4. The system of claim 1, wherein:
the input port of the enclosure is configured to receive a flow of air having a first temperature, and
the output port of the enclosure is configured to provide a flow of air having a second temperature, wherein the first temperature is higher than the second temperature.

5. The system of claim 1, further comprising:
a water purifier having an output connected to the input of the conveyance mechanism and having an input configured to receive the fluid,
wherein the fluid is water.

6. The system of claim 5, wherein the water purifier is configured to filter the fluid using a reverse osmosis process.

7. The system of claim 1, wherein the enclosure has a drain for removal of condensed fluid in the enclosure.

8. The system of claim 1, wherein the piezoelectric material is configured to actuate the plate to vibrate at a frequency according to an AC current applied to the piezoelectric material.

9. The system of claim 8, further comprising:
a driver configured to apply the AC current to the piezoelectric material,
wherein the driver is configured to adjust a frequency of the AC current to a resonant frequency of the plate of the nebulizer.

10. The humidifier system of claim 1, further comprising a manifold configured to provide the fluid to the conveyance mechanism.

11. The humidifier system of claim 1, further comprising a pressure control unit configured to control a pressure of the fluid.

12. The humidifier system of claim 1, further comprising a controller configured to provide an actuation signal to the one or more spray units.

13. The humidifier system of claim 1, wherein the enclosure is configured to circulate a flow of air in a cyclonic vortex between the input port and the output port.

14. The humidifier system of claim 1, further comprising a wing shaped head within the enclosure, wherein the wing shaped head is configured to cause a laminar flow of air in the enclosure.

15. The humidifier system of claim 1, further comprising a window configured to provide visual access to a flow of air within the enclosure.

16. The humidifier system of claim 1, further comprising a sensor unit configured to sense at least one of a temperature or a relative humidity of a flow of air within the enclosure.

17. A humidifier comprising:
an enclosure having an input and an output;
an emitter situated in the enclosure, wherein the emitter includes a plate defining one or more holes configured to eject fluid, and wherein the emitter includes a piezoelectric material defining an opening enclosing the one or more holes of the plate;
a fluid conveyance mechanism connected to the emitter; and
a controller configured to:
cause the emitter to provide a fluid flow using an applied voltage having a frequency, wherein the applied voltage and the frequency actuate the piezoelectric material to vibrate the plate and cause the one or more holes to eject the fluid, and
adjust at least one of the applied voltage or the frequency of the applied voltage to adjust the fluid flow.

18. The humidifier of claim 17, wherein the controller is configured to adjust the frequency of the applied voltage based on a current consumption of the emitter.

19. The humidifier of claim 17, further comprising a fluid filtration component having an input for connection to fluid supply and having an output connected to the fluid conveyance mechanism.

20. The humidifier of claim 17, wherein:
the humidifier is configured to provide a flow of air from the input of the enclosure to the output of the enclosure; and
droplets of fluid from the one or more emitters are configured to evaporate within the air due to cyclonic effects on the droplets, wherein the cyclonic effects reduce an evaporation distance to increase an amount of evaporation of the droplets flowing through one or more channels of the enclosure.

21. The humidifier of claim 20, wherein the input of the enclosure is configured to receive a flow of air having a first temperature and the output of the enclosure is configured to provide a flow of air having a second temperature, wherein the first temperature is higher than the second temperature.

22. The humidifier of claim 20, wherein the humidifier is configured to be installed to existing humidifier ductwork by attaching to a housing of a previously installed humidifier.

* * * * *